(12) United States Patent
Okamoto et al.

(10) Patent No.: US 7,021,656 B2
(45) Date of Patent: Apr. 4, 2006

(54) AIRBAG DEVICE

(75) Inventors: Yutaka Okamoto, Wako (JP); Yuji Kikuchi, Wako (JP)

(73) Assignee: Honda Giken Kogyo Kabushiki Kaisha, Minato-ku (JP)

( * ) Notice: Subject to any disclaimer, the term of this patent is extended or adjusted under 35 U.S.C. 154(b) by 307 days.

(21) Appl. No.: 10/652,789

(22) Filed: Aug. 29, 2003

(65) Prior Publication Data

US 2004/0051282 A1 Mar. 18, 2004

(30) Foreign Application Priority Data

Aug. 30, 2002 (JP) ............................. 2002-255911

(51) Int. Cl.
    *B60R 21/16* (2006.01)
(52) U.S. Cl. .................... 280/739; 280/743.1; 180/274
(58) Field of Classification Search ................ 280/731, 280/732, 739, 743.1, 743.2; 180/271, 274
    See application file for complete search history.

(56) References Cited

U.S. PATENT DOCUMENTS

| | | | |
|---|---|---|---|
| 5,100,172 A | | 3/1992 | VanVoorhies et al. |
| 5,603,526 A | * | 2/1997 | Buchanan .................... 280/739 |
| 5,704,639 A | * | 1/1998 | Cundill et al. ............... 280/739 |
| 6,406,055 B1 | | 6/2002 | Faigle et al. |
| 6,547,274 B1 | * | 4/2003 | Ochiai ......................... 280/735 |
| 6,648,371 B1 | * | 11/2003 | Vendely et al. ............. 280/739 |
| 6,659,499 B1 | * | 12/2003 | Jenkins ....................... 280/735 |

FOREIGN PATENT DOCUMENTS

| | | |
|---|---|---|
| DE | 199 12 369 | 5/2000 |
| JP | 11334520 A | 12/1999 |
| WO | WO 99/64273 | 12/1999 |

\* cited by examiner

*Primary Examiner*—David R. Dunn
(74) *Attorney, Agent, or Firm*—Hamre, Schumann, Mueller & Larson, P.C.

(57) ABSTRACT

An airbag device has a bag housing case, an airbag housed in the bag housing case, a plate member provided within the airbag, and a bag pressure release mechanism. When the internal pressure of the airbag reaches a predetermined pressure, the bag pressure release mechanism opens the airbag to prevent an increase in the internal pressure of the airbag. The plate member covers the bag pressure release mechanism when the airbag is in a deflated state. When the airbag is inflated, the plate member is released from coverage of the bag pressure release mechanism by an inflating force.

13 Claims, 26 Drawing Sheets

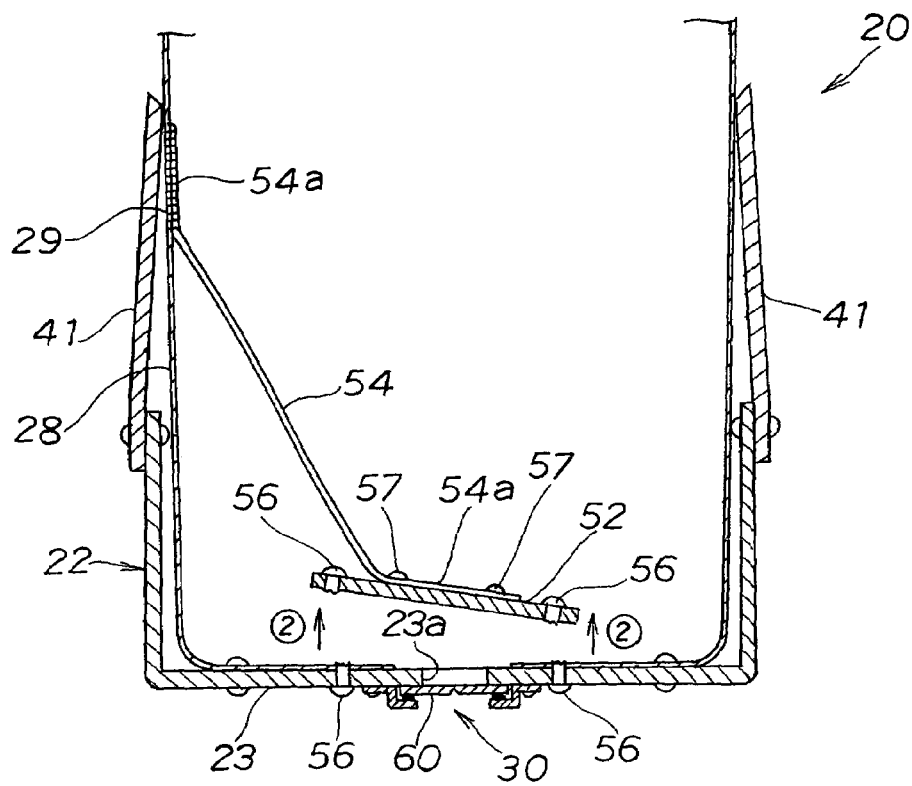
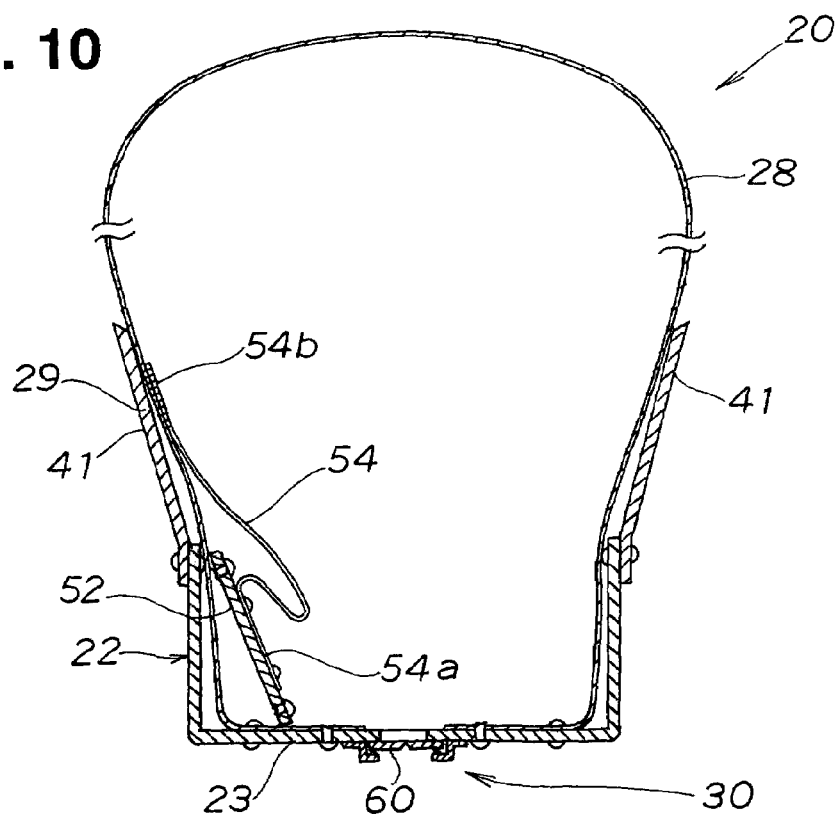

AIRBAG DEVICE

FIELD OF THE INVENTION

The present invention relates to an airbag device with an airbag which, when a vehicle carrying the airbag device collides with an obstacle, expands or inflates to mitigate the resultant impact on the obstacle.

BACKGROUND OF THE INVENTION

Collisions of vehicles with obstacles have some conceivable patterns. It is conceivable that an obstacle after striking the front bumper of a vehicle again strikes another portion of the vehicle. The first collision of the obstacle with the front bumper is called a "primary collision," and the next collision with another portion of the vehicle is called a "secondary collision."

There is an airbag device with an airbag which is inflated with gas generated by an inflator immediately after a primary collision, covering a vehicle outside portion such as an A-pillar or a windshield, and mitigating an impact in a secondary collision of an obstacle with the vehicle outside portion.

When collided by an obstacle, an airbag having a high internal pressure for mitigating a secondary collision of the obstacle, however, can fail to sufficiently mitigate an impact on the obstacle. To solve the problem, a method of reducing an internal pressure by releasing gas within an airbag outside upon collision of an obstacle with the airbag seems possible.

To release gas within an airbag outside, it is required to provide a vent hole in the airbag to release gas by use of an internal pressure for inflating the airbag, for example.

A vehicle having a relatively long distance between the front bumper and the windshield, however, causes an obstacle to take a relatively long period of time between a primary collision with the front bumper and a secondary collision with the airbag. During that period, gas within the airbag is continuously discharged through the vent hole.

It is thus required to feed a large amount of gas into the airbag in view of a discharged amount of gas so as to keep the airbag in an inflated state. It is, however, required to increase the gas supply capacity of an inflator to feed a large amount of gas into the airbag, preventing reduction in size of the airbag device.

As a method for solving the problem, JP-A-11-334520 discloses an "Airbag Device," for example.

This airbag device has a control valve switched between energization and de-energization for opening and closing a vent hole, an internal pressure sensor for detecting the internal pressure of an airbag to control the control valve, and a controller for controlling the control valve.

In the above device, when the airbag starts inflating, the vent hole is closed by the control valve. When an obstacle secondarily collides with the airbag after completion of inflation of the airbag, increasing the internal pressure thereof to a predetermined value, the sensor detects the internal pressure of the airbag and the control valve is actuated based on the detection signal, opening the vent hole. In this manner, it is possible not to discharge gas through the vent hole when the airbag starts inflating upon a collision of the vehicle with an obstacle, and to release gas outside through the vent hole when the obstacle is in a secondary collision with the airbag. The discharged amount of gas can thus be reduced to reduce the capacity of the inflator. In addition, the release of gas outside through the vent hole in the secondary collision of the obstacle with the airbag allows efficient mitigation of impact on the obstacle.

As stated above, the use of the airbag device in JP-A-11-334520 can provide sufficient effects in the reduction of capacity of the inflator and also the efficient absorption of impact on an obstacle.

This airbag device, however, needs to be provided with the internal pressure sensor, control valve and controller which are likely to relatively complicate the structure of the airbag device, preventing size reduction of the airbag device.

In this context, an airbag device being capable of efficiently mitigating an impact on an obstacle and having a simplified structure for size reduction is desired.

SUMMARY OF THE INVENTION

According to an aspect of the present invention, there is provided an airbag device which comprises: a bag housing case; an airbag housed in a folded or deflated state in the bag housing case; a plate member disposed within and connected to the airbag; and a bag pressure release mechanism provided in the bag housing case in opposed relation to an inside of the airbag, the mechanism being designed to open the airbag when an internal pressure of the airbag reaches a predetermined pressure after the airbag is inflated, thereby preventing an increase in the internal pressure of the airbag, the plate member being designed such that it covers the bag pressure release mechanism when the airbag is deflated and is retracted away from the bag pressure release mechanism by an inflating force of the airbag when the airbag is inflated.

In this arrangement, when the airbag is deflated, the plate member covers the bag pressure release mechanism, and when the airbag starts inflating, opening a cover of the bag housing case by its inflating force, the bag pressure release mechanism is kept covered by the plate member. Thus, the plate member prevents transmission of the inflating force of the airbag to the bag pressure release mechanism which is thus prevented from being opened under the effect of the inflating force of the airbag.

The plate member covering the bag pressure release mechanism is designed to be retracted away therefrom in conjunction with the inflation of the airbag. When the internal pressure of the airbag is increased by the collision of an obstacle with the airbag, for example, after the airbag is inflated, the increased internal pressure causes the bag pressure release mechanism to be opened so that gas within the airbag escapes through the bag pressure release mechanism to provide efficient mitigation of impact on the obstacle.

Since the airbag can be inflated with the bag pressure release mechanism kept closed, gas is prevented from being discharged with the bag pressure release mechanism closed until an obstacle collides with the airbag. The amount of gas discharged from the airbag can thus be reduced to reduce the capacity of an inflator for discharging gas into the airbag, resulting in size reduction.

The simple structure of only connecting the plate member to the airbag allows the bag pressure release mechanism to be released only when needed. An internal pressure sensor, control valve and controller which have conventionally been required can be eliminated, resulting in a simplified structure of the airbag device and cost reduction.

Preferably, the bag housing case has at least one vent hole formed in its bottom.

It is preferred that the plate member is detachably mounted to an inside bottom of the bag housing case for covering the at least one vent hole; and the bag pressure release mechanism is mounted to the outside bottom of the bag housing case for covering the vent hole. The bag pressure release mechanism is designed to release gas within the airbag outside through the vent hole when a pressure higher than the predetermined pressure of the airbag is formed.

According to another aspect of the present invention, there is provided an airbag device which comprises: a bag housing case; an airbag housed in a deflated, folded state within the bag housing case; a strap member disposed within the airbag and connected to or integrally formed with the airbag; and a bag pressure release mechanism provided in the bag housing case in confronting relation to an inside of the airbag, the mechanism being designed to open the airbag when the internal pressure of the airbag reaches a predetermined pressure after the airbag is inflated, thereby preventing an increase in the internal pressure of the airbag, the strap member being designed such that it covers the bag pressure release mechanism when the airbag is deflated and is retracted from the bag pressure release mechanism by an inflating force of the airbag when the airbag is inflated.

The simple structure of only connecting or integrally forming the strap member to or with the airbag permits the bag pressure release mechanism to be released only when needed. An internal pressure sensor, control valve and controller which have been conventionally required can thus be eliminated.

It is preferable that the bag housing case has at least one vent hole formed in the bottom, the strap member is demountably mounted to an inside bottom of the bag housing case for covering the at least one vent hole, and the bag pressure release mechanism is mounted to an outside bottom of the bag housing case for covering the vent hole.

BRIEF DESCRIPTION OF THE DRAWINGS

Preferred embodiments of the present invention will be described in detail below, by way of example only, with reference to the accompanying drawings, in which:

FIGS. 9 and 10 are diagrams illustrating states in which the airbag is inflated and a plate member is removed from the bottom of the bag housing case;

DETAILED DESCRIPTION OF THE PREFERRED EMBODIMENTS

Figure 1:
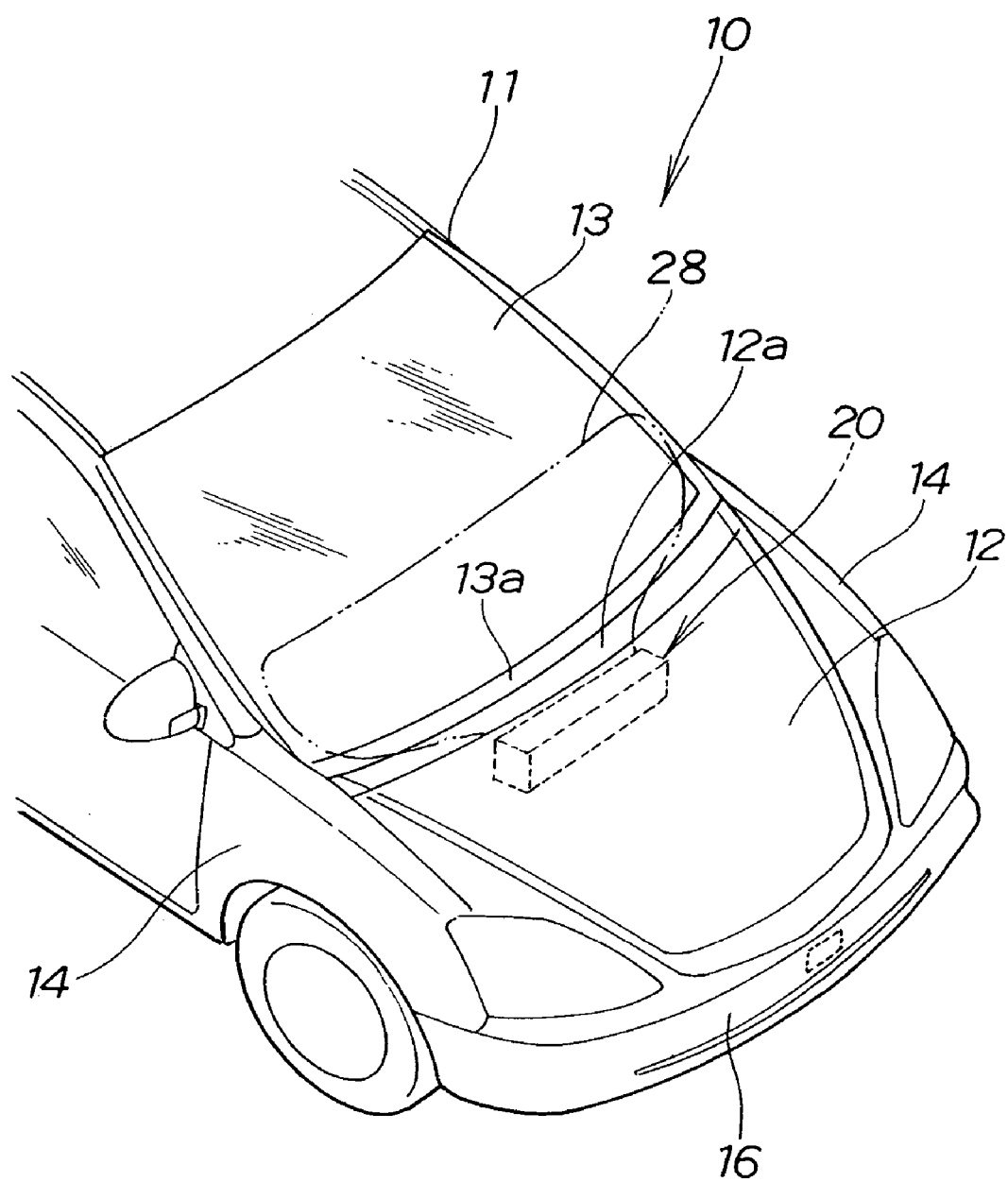
FIG. 1 is a perspective view of a vehicle with an airbag device according to the present invention.

A vehicle 10 shown in FIG. 1 has a bonnet 12 at the front of a vehicle body 11 and an airbag device 20 provided below a rear end 12*a* of the bonnet 12*a* in proximity to a bottom portion 13*a* of a windshield 13. In the Figure, reference numeral 14 denotes a front wing and 16 a front bumper.

An airbag 28 shown by imaginary lines is inflated and ballooned out from the airbag device 20 forwardly of the windshield 13. Description will be made below about the airbag device 20.

FIGS. 2 to 10 illustrate an airbag device according to a first embodiment.

Figure 2:
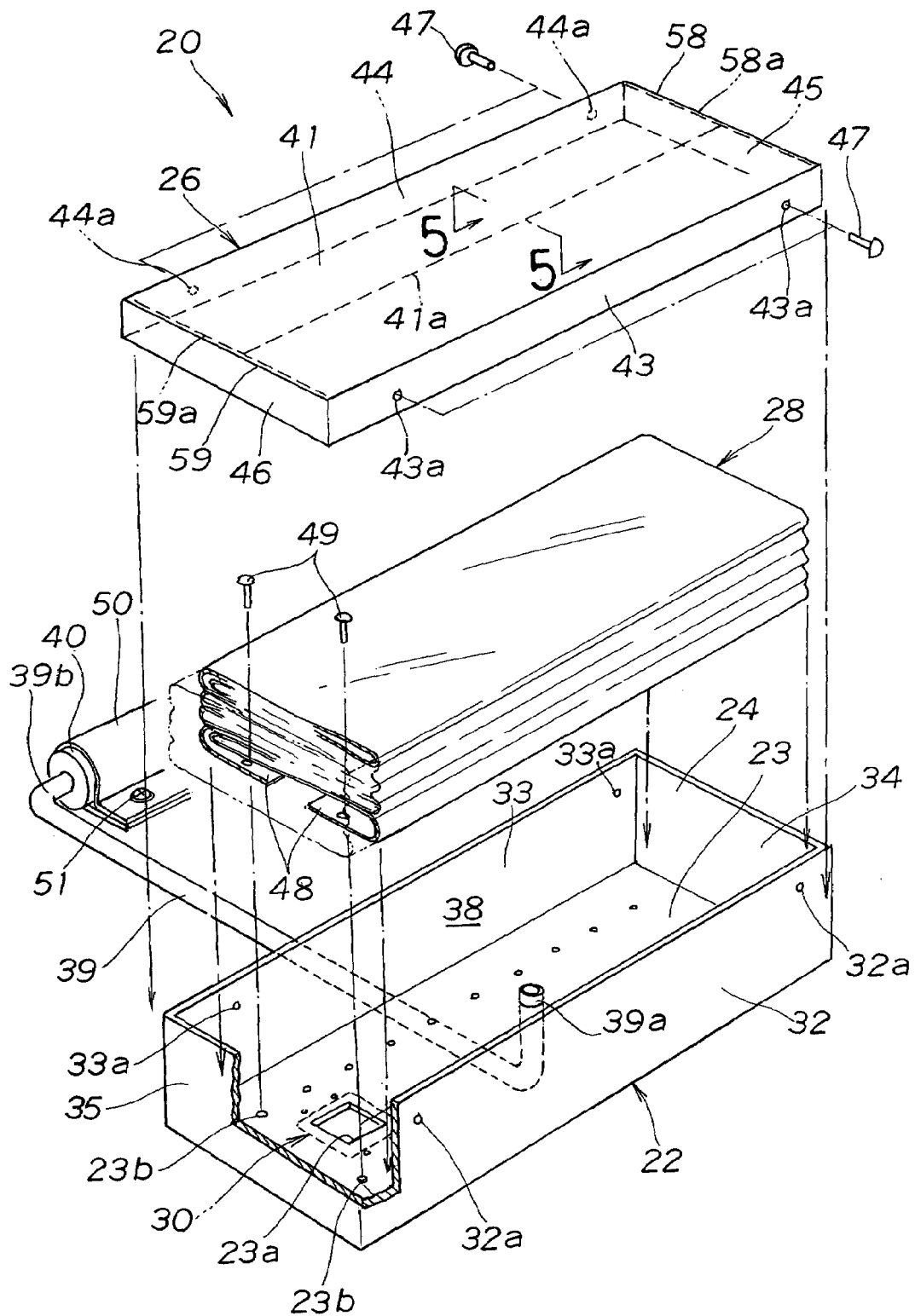
FIG. 2 is an exploded perspective view of an airbag device according to a first embodiment of the present invention.

Referring to FIG. 2, the airbag device 20 in the first embodiment is provided mainly with a bag housing case 22 provided below the rear end 12*a* of the bonnet 12 shown in FIG. 1, a cover 26 closing an opening 24 of the bag housing case 22, the airbag 28 housed in the bag housing case 22, and a bag pressure release mechanism 30 provided at the bottom 23 of the bag housing case 22.

The bag housing case 22 has the bottom 23 formed in a rectangular shape and front, rear, left and right sidewalls 32, 33, 34 and 35 provided at the front, rear, left and right sides of the bottom 23, thereby forming a housing space 38. In the housing space 38, the airbag 28 made from a flexible material is housed in a folded state.

A vent hole 23a formed in the bottom 23 is closable by the bag pressure release mechanism 30. A distal end 39a of a gas supply pipe 39 is protruded through the bottom 23 into the housing space 38. A plurality of mounting holes 23b is formed in the bottom 23 to mount the airbag 28 onto the bottom 23. Mounting holes 32a, 32a and 33a, 33a are formed in the front and rear sidewalls 32 and 33 of the bag housing case 22, respectively, to secure the cover 26 to the bag housing case 22.

A proximal end 39a of the gas supply pipe 39 is connected to an inflator 40 so that the inflator 40 communicates with the housing space 38 via the gas supply pipe 39. The inflator 40 is fitted in a mounting bracket 50 and the mounting bracket 50 is secured to the vehicle body 11 (see FIG. 4) with a plurality of screws 51, whereby the inflator 40 is fixed to the vehicle body 11.

In the description of the first embodiment, the inflator 40 is provided outside the bag housing case 22. Alternatively, the inflator 40 may be provided within the bag housing case 22.

The cover 26 is a member covering the opening 24 of the bag housing case 22, thereby closing the bag housing case 22. The cover 26 consists of a cover plate 41 formed in a rectangular shape and front, rear, left and right cover sidewalls 43, 44, 45 and 46 provided at the front, rear, left and right sides of the cover plate 41.

The front cover sidewall 43 has mounting holes 43a, 43a. The rear cover sidewall 44 has mounting holes 44a, 44a.

Screws 47, 47 are fastened into the mounting holes 43a, 43a in the front cover sidewall 43 and the mounting holes 32a, 32a in the front sidewall 32 of the bag housing case 22, and screws 47, 47 are fastened into the mounting holes 44a, 44a in the rear cover sidewall 44 and the mounting holes 33a, 33a in the rear sidewall 33 of the bag housing case 22, whereby the cover 26 is secured to the bag housing case 22, closing the opening 24 of the bag housing case 22.

The airbag 28 is fixed at its bottom edges 48, 48 to the bottom 23 of the bag housing case 22 with a plurality of screws 49 and housed in the bag housing case 22 in a folded state. The distal end 39a of the gas supply pipe 39 is located within the airbag 28.

Figure 3:
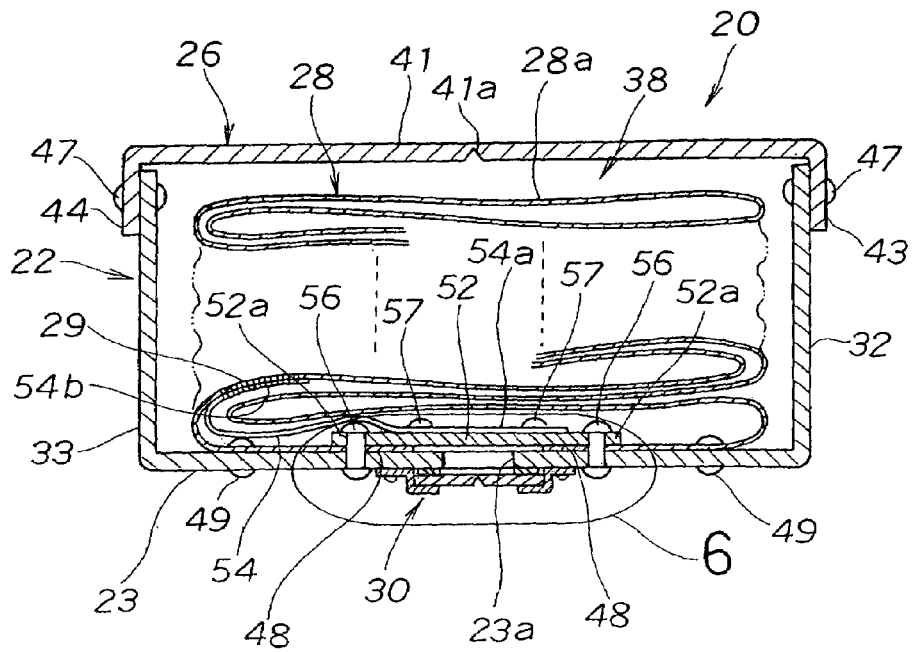
FIG. 3 is a cross-sectional view of the airbag device in the first embodiment shown in FIG. 2.

As shown in FIG. 3, the bag pressure release mechanism 30 faces the inside of the airbag 28 through the vent hole 23a. A plate member 52 is located within the airbag 28. The plate member 52 is connected to a sidewall 29 of the airbag 28 via a strap 54. When the airbag 28 is folded, the plate member 52 covers the bag pressure release mechanism 30. When the airbag 28 is inflated, the plate member 52 is removed from the bag pressure release mechanism 30 by the expanding force of the airbag 28.

The bottom edges 48, 48 of the airbag 28 are disposed away from the vent hole 23a in the bottom 23. The plate member 52 is placed on the bottom edges 48, 48 of the airbag 28, covering the vent hole 23a in the bottom 23. The plate member 52 is fastened at its opposite ends 52a, 52a to the bottom 23 with screws 56, 56, thereby being fixed to the bottom 23.

The plate member 52 is a rectangular plate material with an external shape formed larger than the vent hole 23a to be able to cover the vent hole 23a.

A proximal end 54a of the strap 54 is fastened to the top surface of the plate member 52 with screws 57, 57. A distal end 54b thereof is stitched to the sidewall 29 of the airbag 28. The plate member 52 is thus connected to the sidewall 29 of the airbag 28 via the strap 54. The screws 57, 57 for fastening the strap 54 to the plate member 52 are made from a material having a greater tensile strength than that of the screws 56, 56 for fixing the plate member 52 to the bottom 23.

Figure 4:
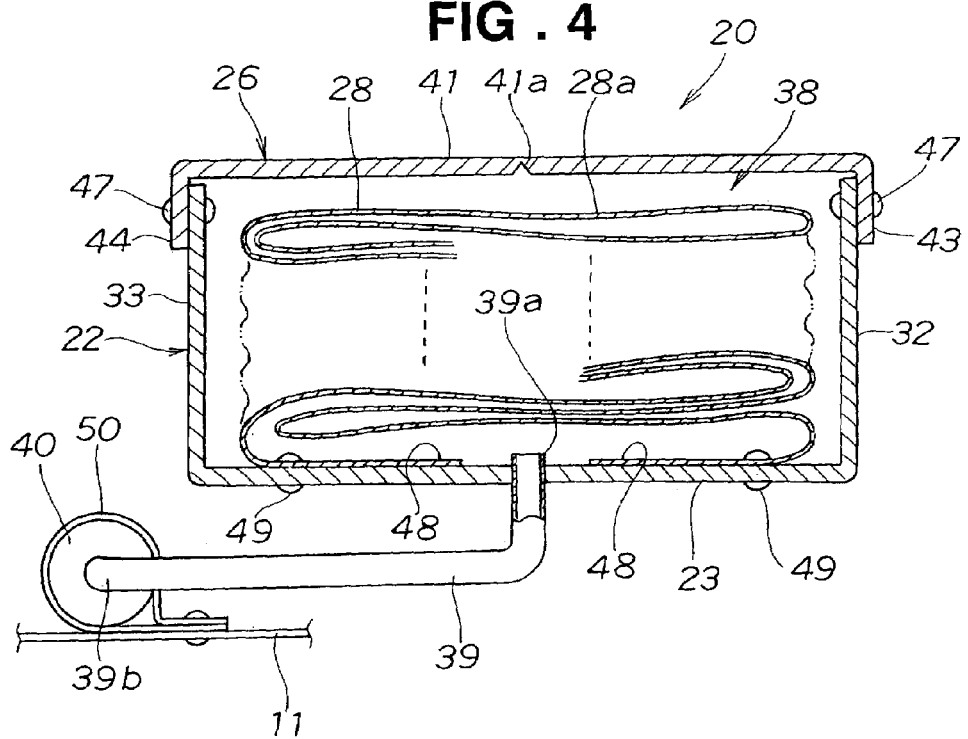
FIG. 4 is a cross-sectional view of the airbag device with an inflator for feeding gas into an airbag shown in FIG. 3.

As shown in FIG. 4, the distal end 39a of the gas supply pipe 39 is protruded through the bottom 23 of the bag housing case 22 into the housing space 38, thereby being located within the airbag 28. A proximal end 39b of the gas supply pipe 39 is connected to the inflator 40. The inflator 40 communicates with the housing space 38 via the gas supply pipe 39. A high pressure gas generated by the inflator 40 is thus fed through the gas supply pipe 39 into the airbag 28.

Figure 5:
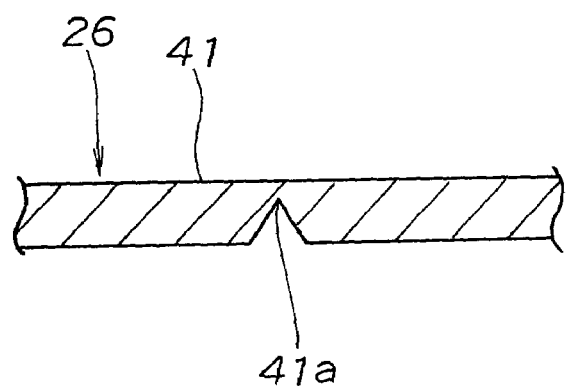
FIG. 5 is a cross-sectional view taken along line 5—5 of FIG. 2, illustrating a central tear seam formed in a cover plate of a bag housing case.

As shown in FIG. 5, the cover plate 41 constituting a part of the cover 26 has a linear break portion (hereinafter referred to as a "central tear seam") 41a with a small thickness formed by cutting off a longitudinal central portion.

Like the first tear seam 41a, the cover plate 26 has, as shown in FIG. 2, a left tear seam 58a formed at a left corner 58 at which the left edge of the cover plate 41 and the left cover sidewall 45 meet, and a right tear seam 59a formed at a right corner 59 at which the right edge of the cover plate 41 and the right cover sidewall 46 meet. The central tear seam 41a, left tear seam 58a and right tear seam 59a form a substantially H-shaped break portion.

Figure 6:
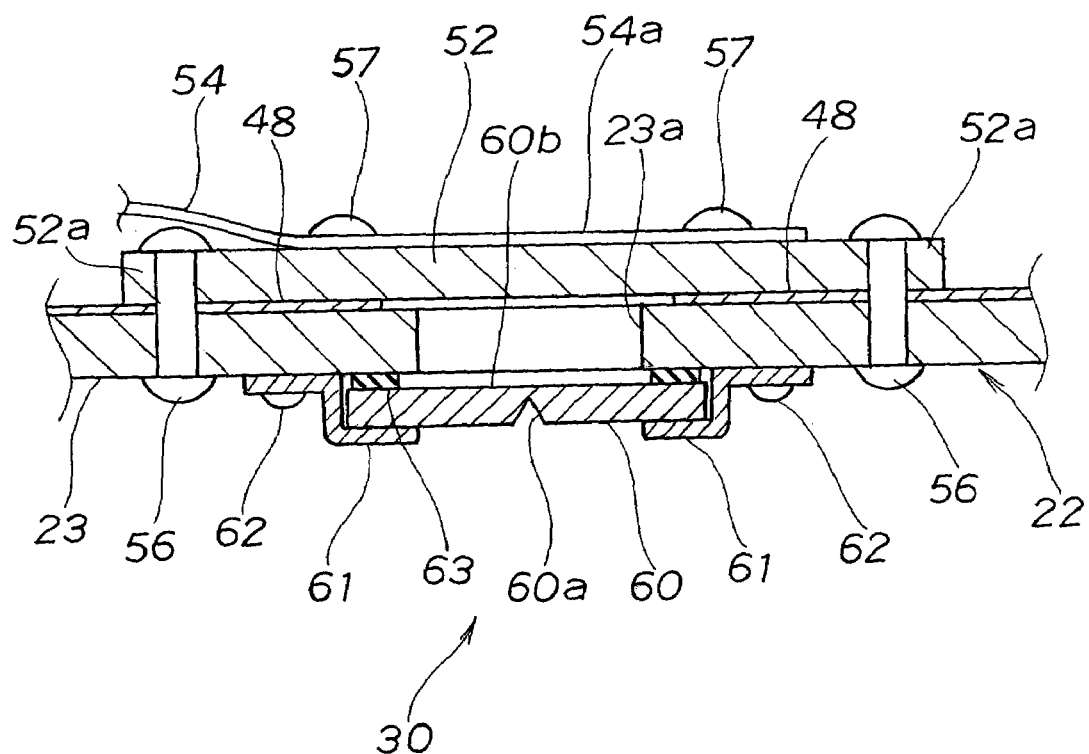
FIG. 6 is an enlarged view of portion 6 in FIG. 3.

As shown in FIG. 6, the opposite ends 52a, 52a of the plate member 52 are fastened with the screws 56, 56 to the top surface of the bottom 23 of the bag housing case 22 with the bottom edges 48, 48 of the airbag 28 interposed therebetween. The plate member 52 fixed to the bottom 23 covers the vent hole 23a. The proximal end 54a of the strap 54 is fastened to the top surface of the plate member 52 with the screws 57, 57.

The bag pressure release mechanism 30 secured to the bottom 23 of the bag housing case 22 has a resin plate 60 formed with a V-shaped notch 60a in the center, and brackets 61, 61 supporting the resin plate 60. The resin plate 60 is opposite to the vent hole 23a formed in the bottom 23. The brackets 61, 61 are fixed to the bottom 23 with screws 62, 62. In the shown example, a sealing member 63 is interposed between the resin plate 60 and the bottom 23. Alternatively, the sealing member 63 may be interposed between the resin plate 60 and the brackets 61, 61. The resin plate 60 thus closes the vent hole 23a.

When the internal pressure of the airbag 28 reaches a predetermined pressure (hereinafter referred to as a "release pressure"), acting on a rear surface 60b of the resin plate 60 (the surface opposite to the vent hole 23a), the resin plate 60 breaks at the notch 60a, opening the vent hole 23a. With the opening of the vent hole 23a, the gas within the airbag 28 escapes outside through the vent hole 23a.

The formation of the notch 60a in the resin plate 60 allows proper breakage thereof at the notch 60a when the internal pressure of the airbag 28 reaches the release pressure. The release pressure can be easily adjusted by changing the depth of the notch 60a in the resin plate 60.

The bag pressure release mechanism 30 is made up with the resin plate 60, whereby the bag pressure release mechanism 30 can be made compact. The bag pressure release mechanism 30 can thus be disposed in a narrow space, reducing restrictions on the mounting space. The resin plate 60 is preferable because of its corrosion resistance.

Since the airbag 28 is inflated upward of the bag housing case 22, a mounting space for mounting the bag pressure release mechanism 30 to the bottom 23 of the bag housing case 22 can be found easily. The bag pressure release mechanism 30 is thus provided at the bottom 23 of the bag housing case 22. This arrangement reduces restrictions on mounting space for mounting the bag pressure release mechanism 30, facilitating the mounting of the bag pressure release mechanism 30.

Now, an inflation operation of the airbag device 20 in the first embodiment will be described with reference to FIGS. 7 to 13.

Figure 7:
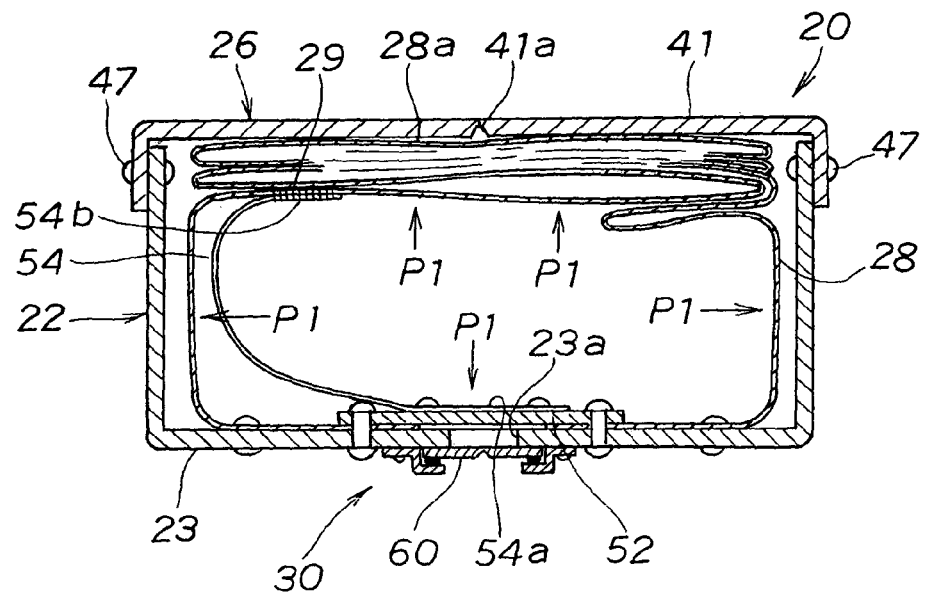
FIG. 7 is a diagram illustrating a state in which gas starts being supplied by the inflator to the airbag device shown in FIG. 3.

In FIG. 7, when the vehicle 10 shown in FIG. 1 collides with an obstacle, an igniter (not shown) is energized, igniting the inflator 40 (see FIG. 4). A high pressure gas generated by the inflator 40 flows into the airbag 28 via the gas supply pipe 39. The airbag 28 starts expanding under the gas pressure. The top 28a of the airbag 28 abuts on the rear surface of the cover plate 41 of the cover 26.

From this state, gas continuously flows into the airbag 28, increasing the internal pressure of the airbag 28 to a predetermined pressure P1, and causing a predetermined boosting force acting on the cover plate 41. As a result, the cover plate 41 breaks at the central tear seam 41a of, left tear seam 58a at the left corner 58 and right tear seam 59a at the right corner 59 shown in FIG. 2.

At that time, the plate member 52 covers the vent hole 23a, preventing the resin plate 60 of the bag pressure release mechanism 30 from being subjected to the predetermined pressure P1. The resin plate 60 is thus prevented from breaking and opening the bag pressure release mechanism 30.

Figure 8:
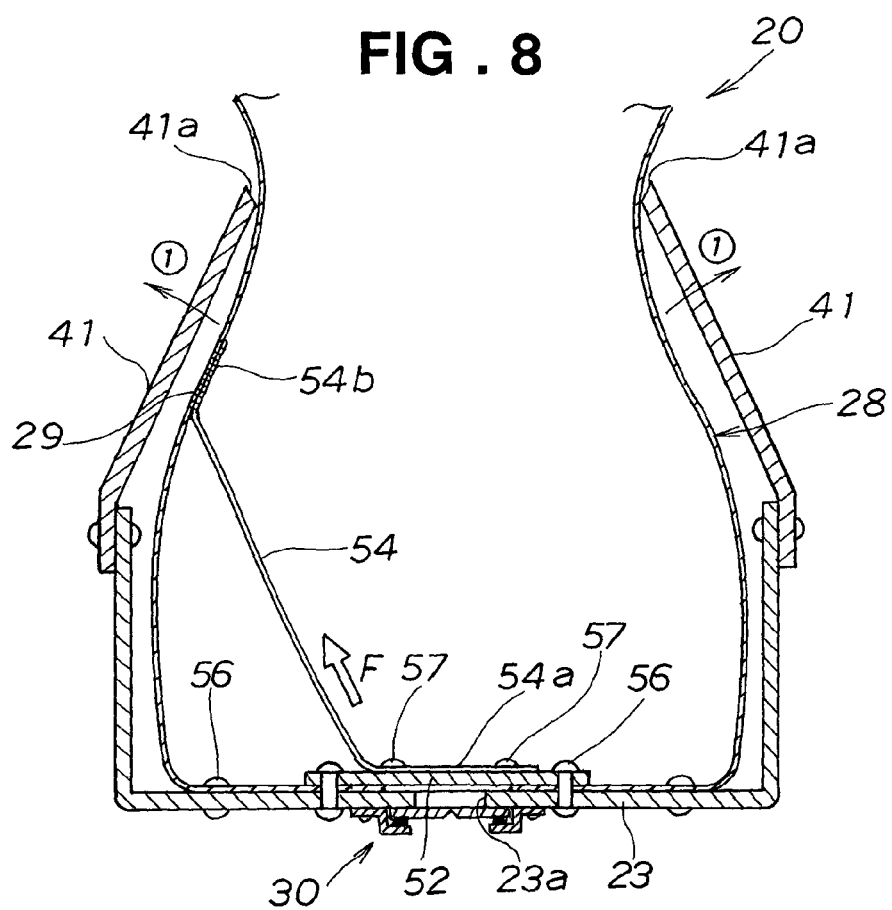
FIG. 8 is a diagram illustrating a state in which, from the state in FIG. 7, gas is further supplied and the airbag is inflated, breaking the cover plate of the bag housing case.

In FIG. 8, with the breakage at the tear seams 41a, 58a and 59a, the cover plate 41 opens like double doors as shown by arrows ①. Under this state, the sidewall 29 of the airbag 28 uprises substantially vertically.

When the sidewall 29 of the airbag 28 uprises substantially vertically, the strap 54, the distal end 54b of which is stitched to the sidewall 29 of the airbag 28, is pulled into a straitened state, and a tensile force F acts on the strap 54 as shown by an arrow.

In FIG. 9, gas continuously flows into the airbag 28, thereby further inflating the airbag 28. The tensile force F (see FIG. 8) acting on the strap 54 increases to a predetermined value, thereby breaking the screws 56, 56 fastening the plate member 52 to the bottom 23. With the breakages of the screws 56, 56, the strap 54 lifts the plate member 52 from the bottom 23 of the bag housing case 22 as shown by arrows ②.

As a result, the rear surface of the resin plate 60 is exposed to the inside of the airbag 28 through the vent hole 23a and the internal pressure of the airbag 28 acts on the resin plate 60. At this point in time, however, inflation of the airbag 28 proceeds to an almost finished state, and the internal pressure of the airbag 28 is lower than the predetermined value P1 shown in FIG. 7. Thus the internal pressure of the airbag 28 acting on the resin plate 60 does not break the resin plate 60 to open the bag pressure release mechanism 30.

As shown in FIG. 10, gas continuously flows into the airbag 28, fully inflating the airbag 28.

At this time, the internal pressure of the airbag 28 is kept at a target initial value and the bag pressure release mechanism 30 is kept in a closed state because the resin plate 60 of the bag pressure release mechanism 30 is designed not to be broken at the target initial value.

Figure 11:
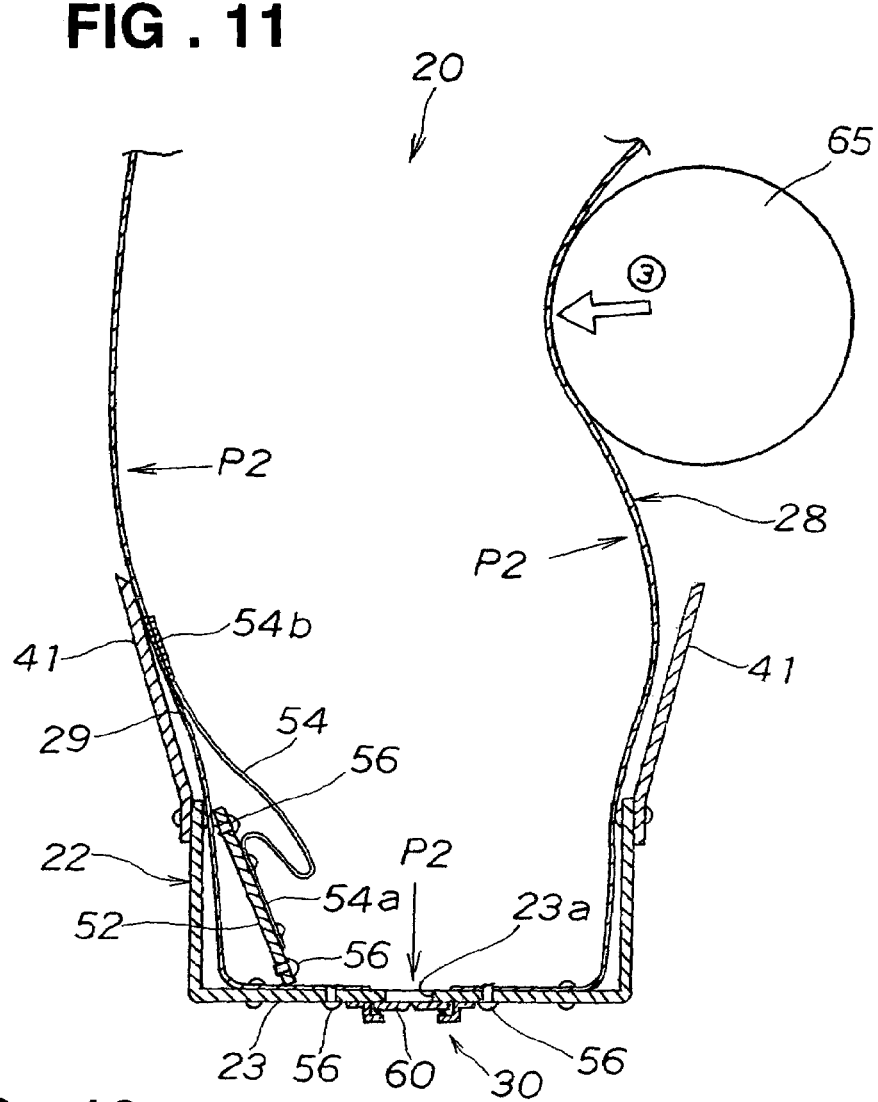
FIG. 11 is a cross-sectional view of the airbag device, illustrating a state in which a release pressure is formed within the airbag when an obstacle is in a secondary collision with the inflated airbag.

As shown in FIG. 11, when the vehicle 10 shown in FIG. 1 collides with an obstacle 65, the obstacle 65 secondarily collides with the airbag 28 with a given time delay. The obstacle 65 presses the airbag 28 as shown by arrow ③. With this, the internal pressure of the airbag 28 increases to the release pressure P2 which acts on the resin plate 60 of the bag pressure release mechanism 30.

Figure 12:
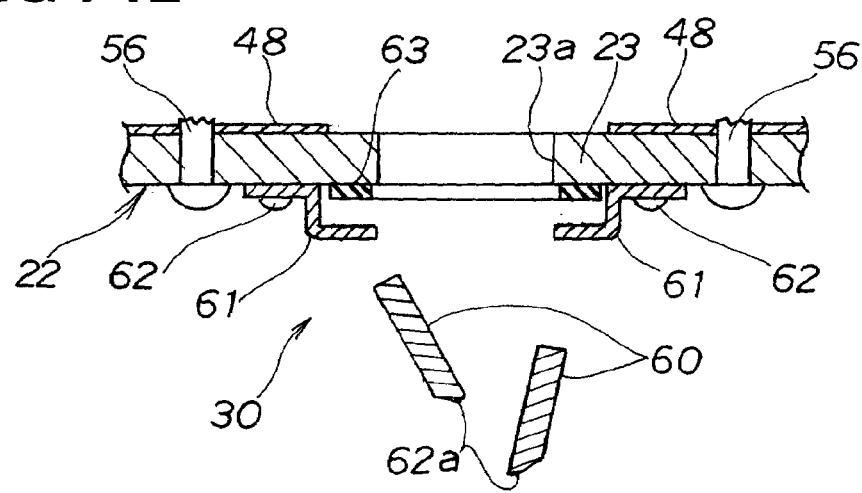
FIG. 12 is a diagram illustrating a state in which a resin plate of a bag pressure release mechanism is broken.

In FIG. 12, with the release pressure P2 formed in the airbag 28 shown in FIG. 11 acting on the resin plate 60 of the bag pressure release mechanism 30, the resin plate 60 breaks at the notch 60a. The resin plate 60 is thus disengaged from the mounting brackets 61, 61, opening the vent hole 23a formed in the bottom 23 of the bag housing case 22.

Figure 13:
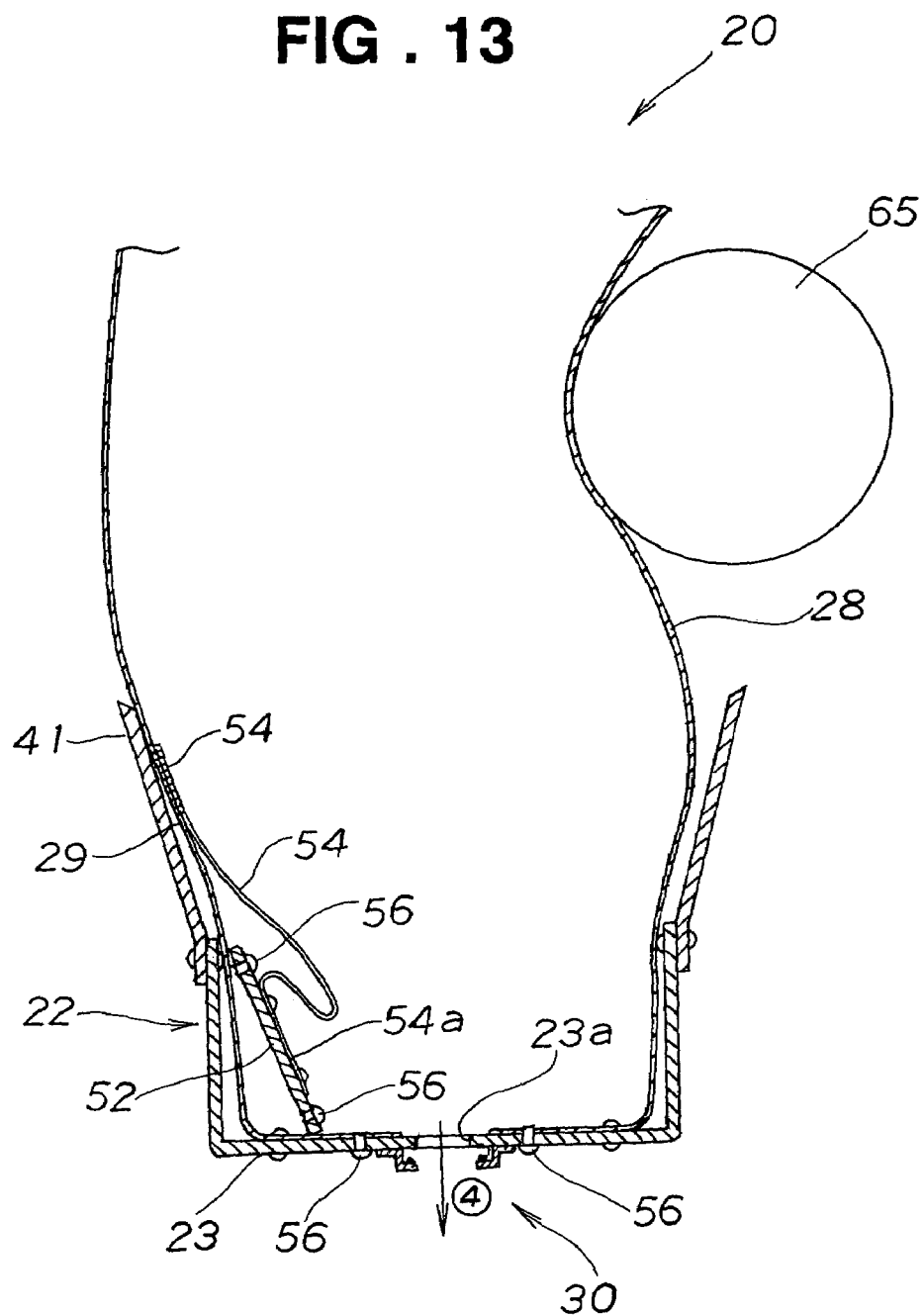
FIG. 13 is a cross-sectional view of the airbag device, illustrating a state in which the resin plate shown in FIG. 12 is broken and the gas within the airbag is released outside through a vent hole.

As shown in FIG. 13, with the opening of the vent hole 23a formed in the bottom 23 of the bag housing case 22, the gas within the airbag 28 is discharged through the vent hole 23a as shown by arrow ④. Thus releasing the gas within the airbag 28 outside through the vent hole 23a efficiently mitigates an impact on the obstacle 65.

In the airbag device 20 of the first embodiment, the cover 26 is opened without releasing the bag pressure release mechanism 30, thereby to prevent the discharge of gas with the bag pressure release mechanism 30 closed until the obstacle 65 collides with the airbag 28.

In this manner, the releasing timing of the bag pressure release mechanism 30 can be delayed to reduce the amount of gas discharged through the vent hole 23a in the bag housing case 22. It is therefore possible to reduce the gas containing capacity of the inflator 40 to reduce the size of the inflator 40, thereby to provide the airbag device 20 of a small size.

The simple structure of only connecting the plate member 52 to the sidewall 29 of the airbag 28 with the strap 54 permits the bag pressure release mechanism 30 to be released only when needed. An internal pressure sensor, control valve and controller which have conventionally been required can be eliminated, resulting in the airbag device 20 of a simple structure.

Now, an airbag device according to a second embodiment of the present invention will be described with reference to FIGS. 14–17. Components identical with those of the airbag device 20 in the first embodiment are given the same reference numerals and will not be described in detail.

Figure 14:
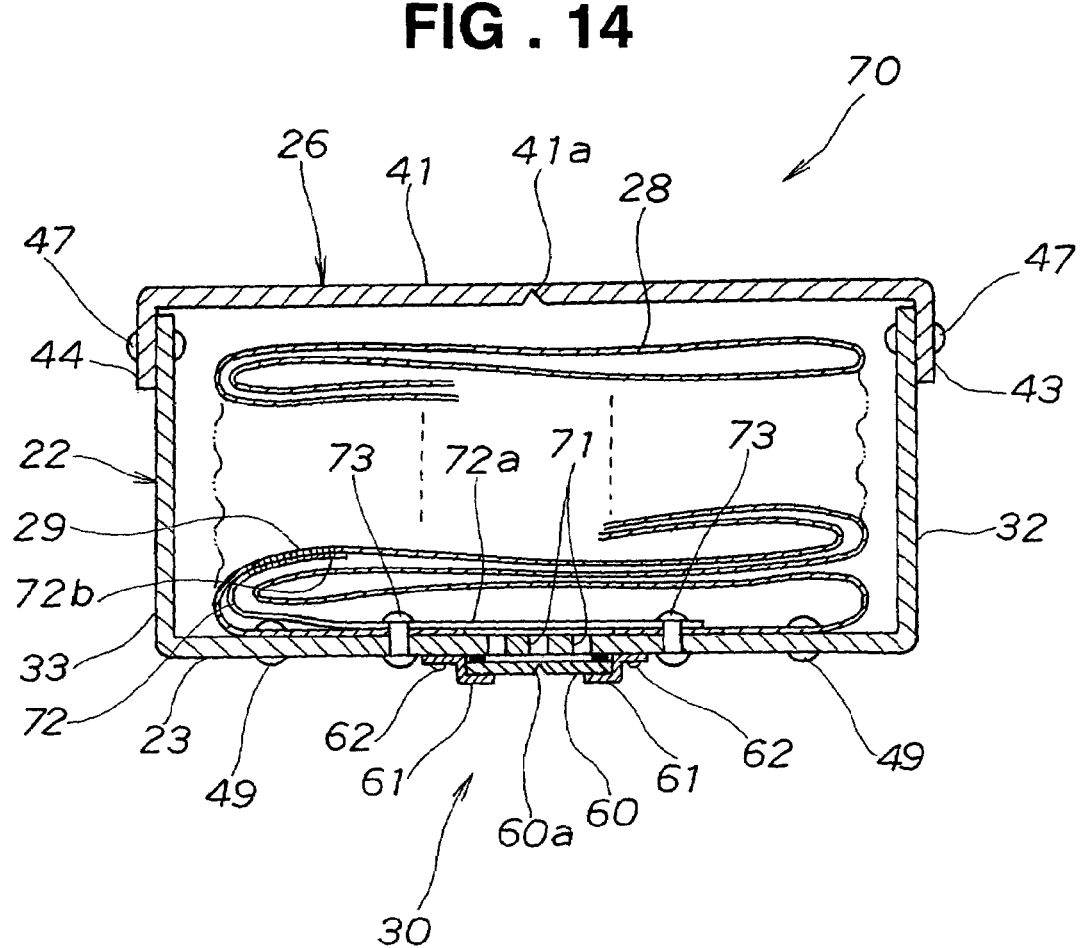
FIG. 14 is a cross-sectional view of an airbag device according to a second embodiment of the present invention.

An airbag device 70 in the second embodiment shown in FIG. 14 has a plurality of vent holes 71 of a small diameter formed in the bottom 23 of a bag housing case 22. The vent holes 71 are covered by a proximal end cover 71a of a strap member 72. The proximal end cover 72a of the strap member 72 is fastened to the bottom 23 with screws 73, 73. A distal end 72b of the strap member 72 is stitched to a sidewall 29 of an airbag 28. The other components are identical with those in the first embodiment.

The strap member 72 is a string. The proximal end cover 72a has flexibility as compared with the plate member 52 (see FIG. 3) in the first embodiment. The vent holes 71 are through holes of a diameter smaller than that of the vent hole 23a in the first embodiment so that the vent holes 71 are closed by the proximal end cover 72a.

Now, an inflating operation of the airbag device 70 in the second embodiment will be described with reference to FIGS. 15 to 17.

Figure 15:
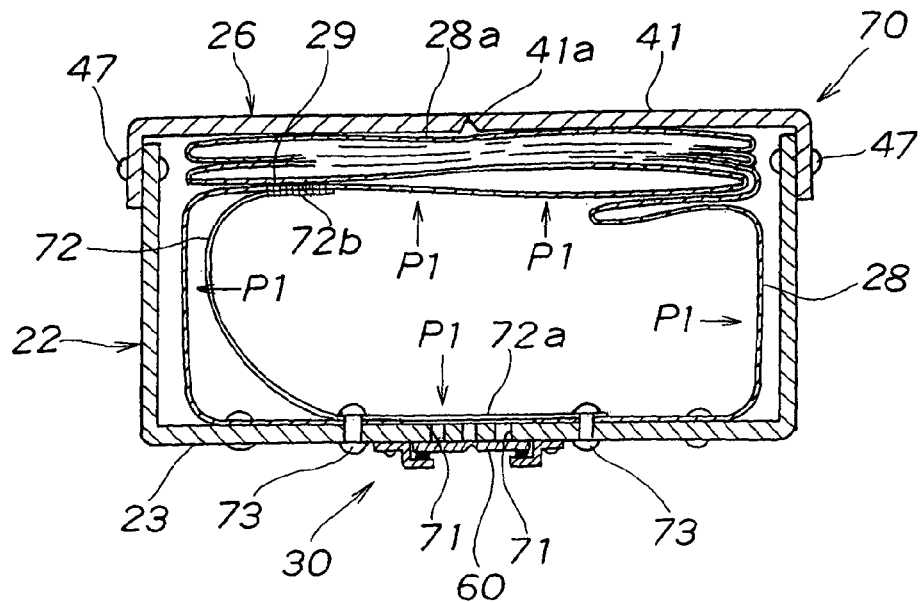
FIG. 15 is a cross-sectional view illustrating a state in which gas is supplied to an airbag shown in FIG. 14 and a predetermine pressure acts on the airbag.

In FIG. 15, when a vehicle 10 shown in FIG. 1 collides with an obstacle, an igniter (not shown) is energized, igniting an inflator 40 (see FIG. 4). A high pressure gas generated by the inflator 40 shown in FIG. 4 flows through a gas supply pipe 39 into the airbag 28. The airbag 28 starts inflating under the gas pressure. The top 28a of the airbag 28 abuts on the inner surface of a cover plate 41 of a cover 26.

From this state, gas continuously flows into the airbag 28, increasing the internal pressure of the airbag 28 to a predetermined pressure P1, and causing a predetermined boosting force acting on the cover plate 41. The boosting force causes breakage of the cover plate 41 at a central tear seam 41a at the center, a left tear seam 58a at a left corner 58 and a right tear seam 59a at a right corner 59 shown in FIG. 2.

At that time, the proximal end cover 72a of the strap member 72 covers and doses the vent holes 71, so that a resin plate 60 of a bag pressure release mechanism 30 does not receive the predetermined pressure P1. The resin plate 60 is thus prevented from breaking and opening the bag pressure release mechanism 30.

Figure 16:
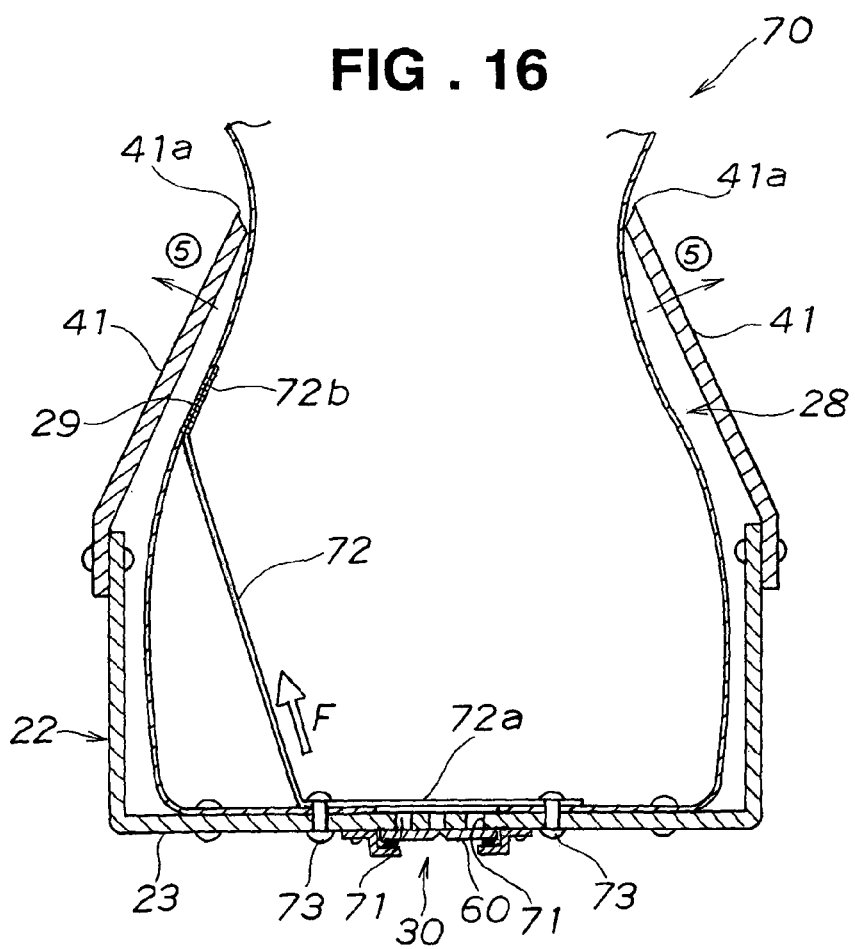
FIG. 16 is a cross-sectional view of the airbag device, illustrating a state in which, from the state in FIG. 15, gas is further fed into the airbag and the airbag is inflated, breaking a tear seam in a cover plate.

In FIG. 16, with the breakage at the tear seams 41a, 58a and 59a (see FIG. 2), the cover plate 41 is opened like double doors as shown by arrows ⑤. Under this state, the sidewall 29 of the airbag 28 uprises substantially vertically.

When the sidewall 29 of the airbag 28 uprises substantially vertically, the strap member 72, the distal end 72b of which is stitched to the sidewall 29 of the airbag 28, is pulled into a straitened state, and a tensile force F acts on the strap member 72 as shown by an arrow.

Figure 17:
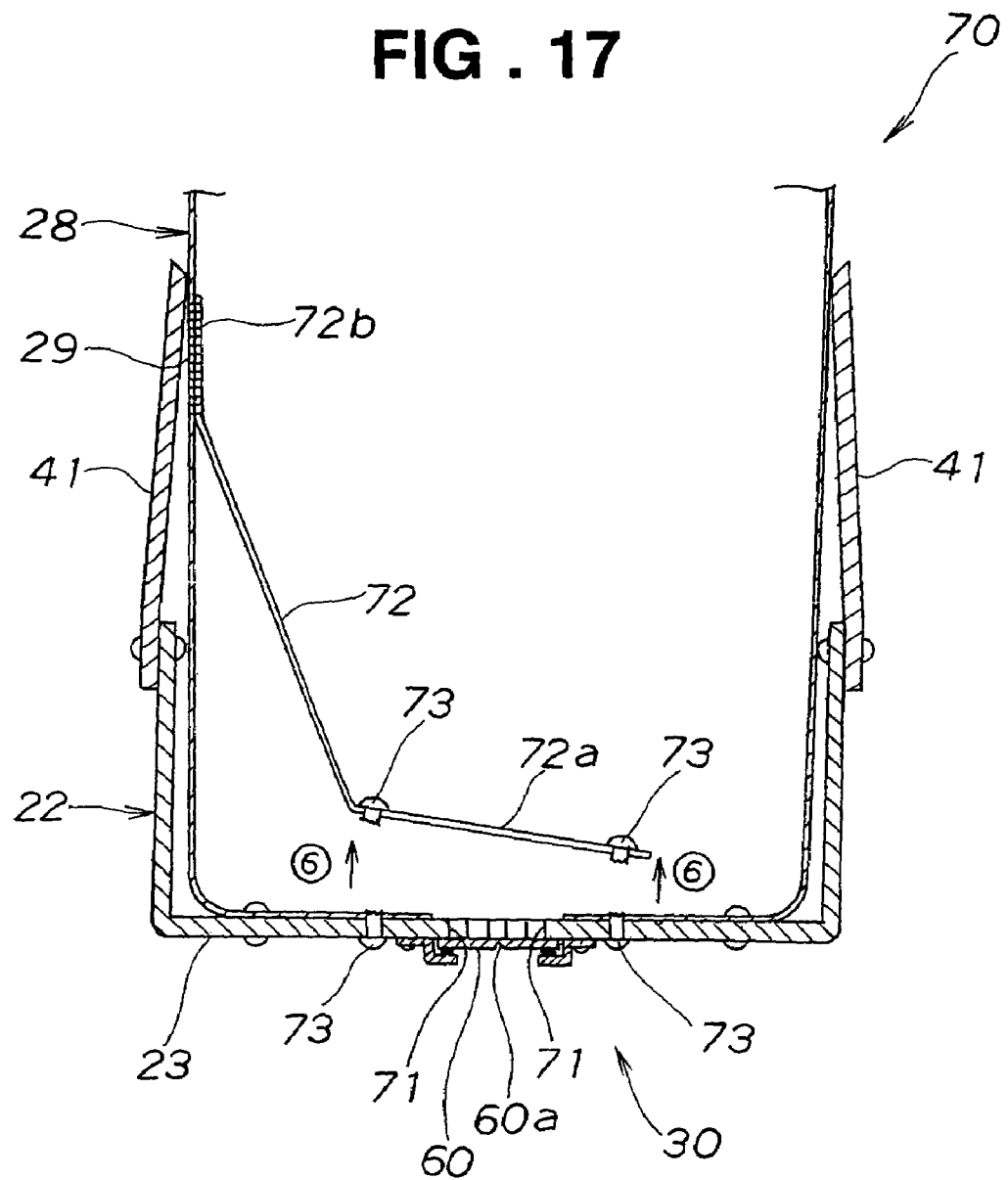
FIG. 17 is a cross-sectional view of the airbag device, illustrating a state in which, from the state in FIG. 16, the airbag is further inflated and a strap member is removed from the bottom.

Gas is continuously let into the airbag 28, thereby further inflating the airbag 28 as shown in FIG. 17. The tensile force F (see FIG. 16) acting on the strap 72 increases to a predetermined value, thereby breaking the screws 73, 73 fastening the proximal end cover 72a of the strap member 72. With the breakages of the screws 73, 73, the proximal end cover 72a of the strap member 72 is lifted from the bottom 23 of the bag housing case 22 as shown by arrows ⑥.

The resin plate 60 of the bag pressure release mechanism 30 faces the inside of the airbag 28 through the vent holes 71 and is subjected to the internal pressure of the airbag 28. At this point in time, however, inflation of the airbag 28 proceeds to an almost finished state, and the internal pressure of the airbag 28 is lower than the predetermined value P1 shown in FIG. 15. Thus the internal pressure of the airbag 28 acting on the resin plate 60 does not break the resin plate 60 to open the bag pressure release mechanism 30.

Gas continuously flows into the airbag 28, thereby fully inflating the airbag 28. With this state, the vehicle 10 (see FIG. 1) collides with an obstacle, and then the obstacle 65 secondarily collides with the airbag 28 with a given time delay as described with FIG. 11, pressing the airbag 28. The internal pressure of the airbag 28 increases to a release pressure P2 and the resin plate 60 breaks at a notch 60a. The vent holes 71 formed in the bottom 23 are opened. With the opening of the vent holes 71, the gas within the airbag 28 escapes outside through the vent holes 71, efficiently mitigating an impact on the obstacle 65.

In the airbag device 70 in the second embodiment, the cover 26 is opened without releasing the bag pressure release mechanism 30 as in the airbag device 20 in the first embodiment, thereby to prevent the discharge of gas with the bag pressure release mechanism 30 closed until the obstacle 65 collides with the airbag 28.

In this manner, the releasing timing of the bag pressure release mechanism 30 can be delayed to reduce the amount of gas discharged through the vent holes 71 in the bag housing case 22. It is therefore possible to reduce the gas containing capacity of the inflator 40 to reduce the size of the inflator 40, thereby to provide the airbag device 70 of a small size.

The airbag device 70 in the second embodiment having the simple structure of only covering the vent holes 71 with the strap member 72 connected to the airbag 28 permits the bag pressure release mechanism 30 to be released only when needed. An internal pressure sensor, control valve and controller which have conventionally been required can be eliminated, resulting in the airbag device 70 of a simple construction.

Further, the second embodiment can eliminate the plate member 52 in the first embodiment, reducing the number of components and simplifying the structure. This facilitates parts management and simplifies the assembling process.

The airbag device 70 in the second embodiment has been described with an example of stitching the strap member 72 to the sidewall 29 of the airbag 28 for connection to the sidewall 29, but is not limited thereto. Alternatively, the strap member 72 may be integrally formed with the sidewall 29 of the airbag 28. The integral formation of the strap member 72 and the airbag 28 can provide the same effects as in the second embodiment.

Figure 18:
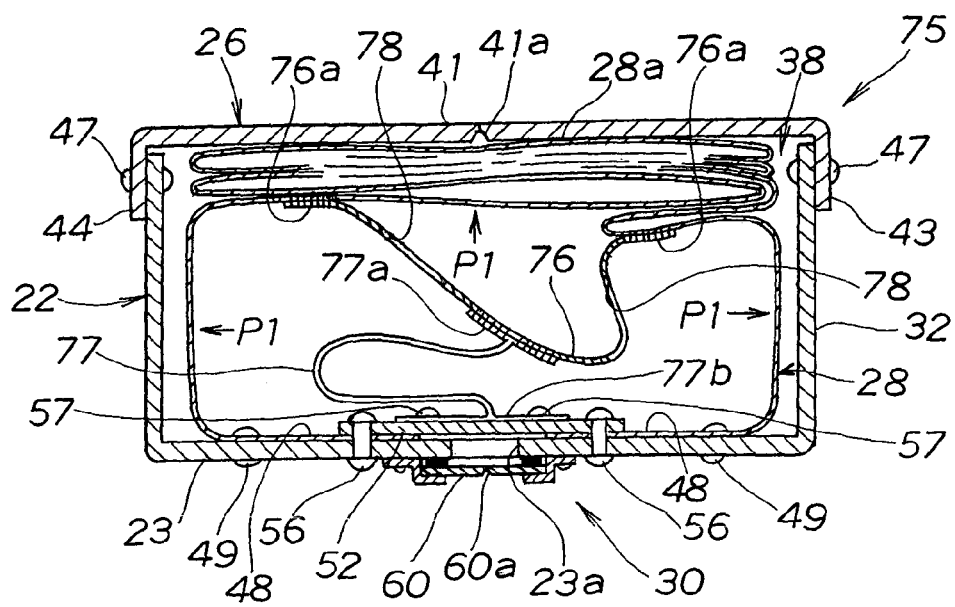
FIGS. 18, 19 and 20 are cross-sectional views illustrating the structure and operation of an airbag device according to a third embodiment of the present invention.
Figure 19:
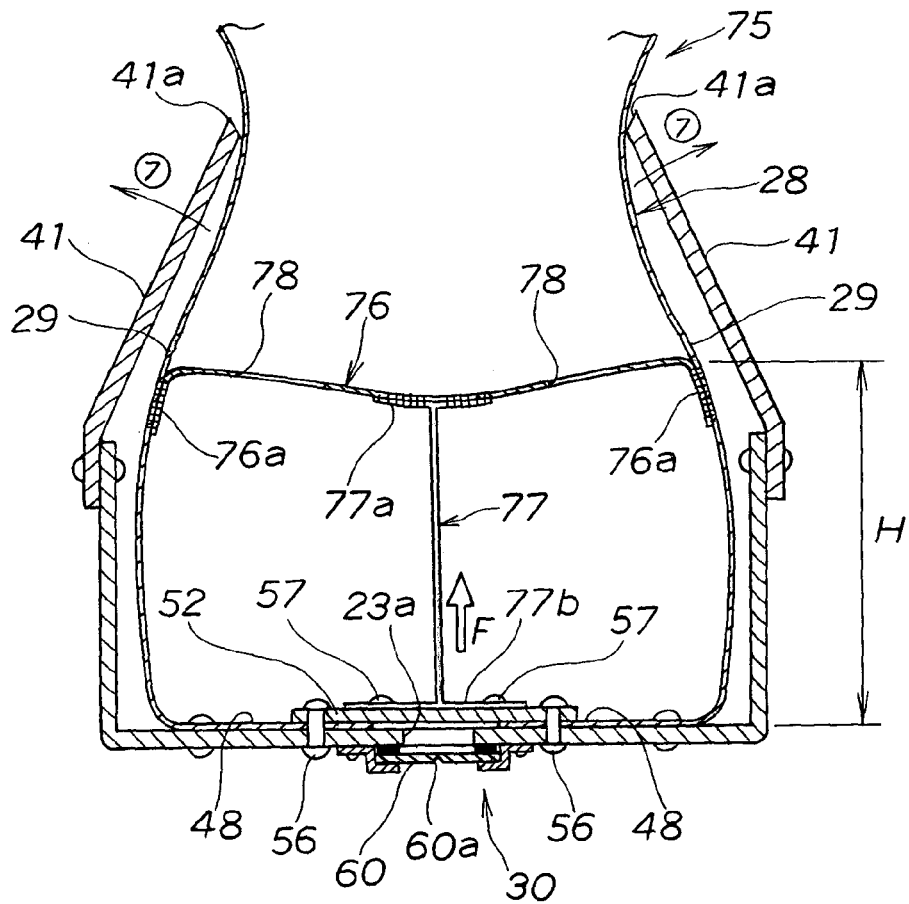
Figure 20:
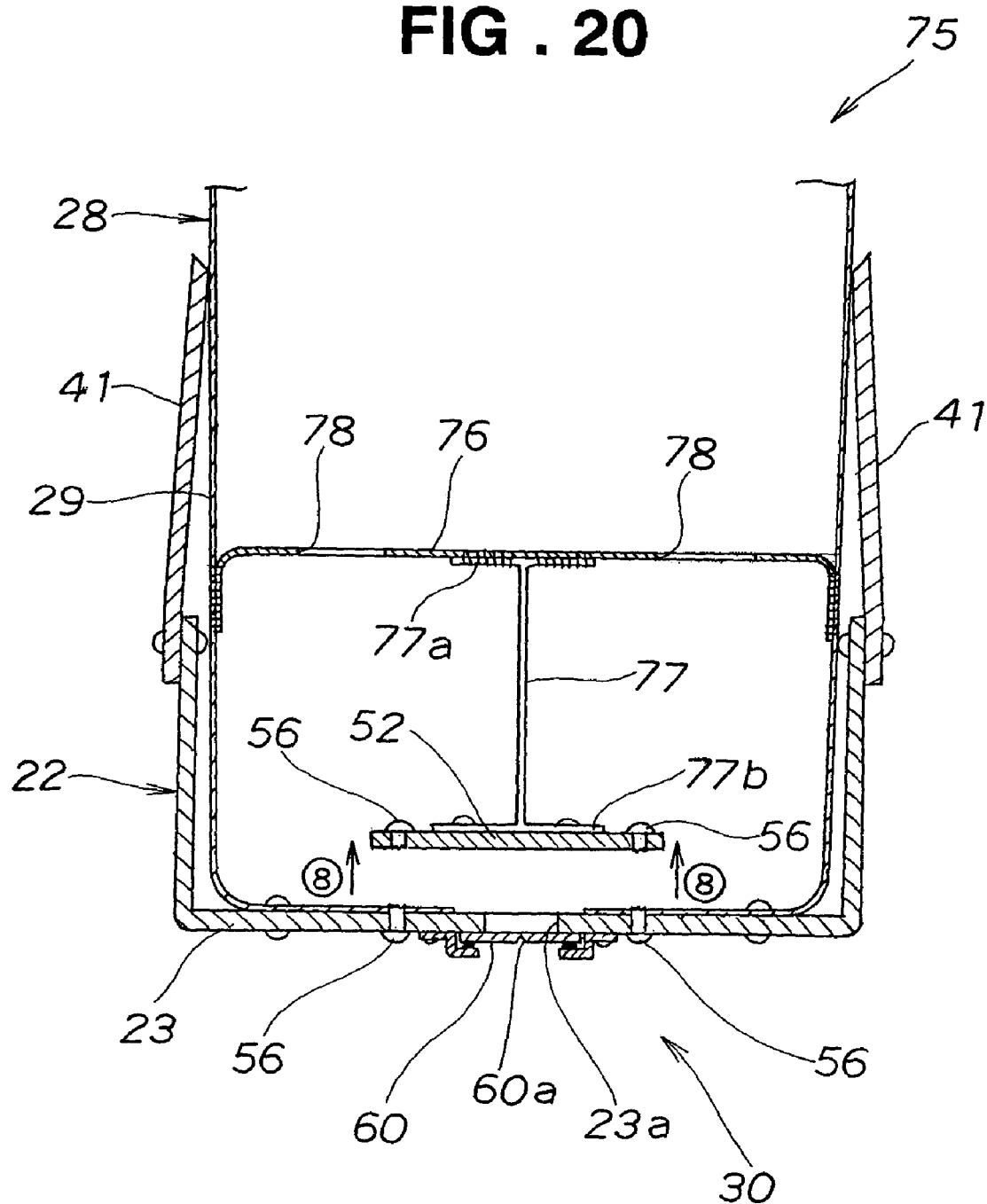

FIGS. 18 to 20 illustrate an airbag device according to a third embodiment of the present invention.

An airbag device 75 in the third embodiment has a lifting member 76 positioned at a predetermined height H from bottom edges 48, 48 of an airbag 28 as shown in FIG. 19. Opposite ends 76a, 76a of the lifting member 76 are stitched to a sidewall 29 of the airbag 28. A distal end 77a of a strap 77 is stitched to the lifting member 76. A proximal end 77b of the strap 77 is fastened to a plate member 52 with screws 57, 57. The other components are identical with those of the airbag device 20 in the first embodiment.

The lifting member 76 and the airbag 28 are made from the same flexible material. The lifting member 76 has a plurality of holes 78, 78 formed in desired positions. Gas is fed from an inflator 40 (see FIG. 4) into the airbag 28 through the holes 78, 78.

The distal end 77a of the strap 77 has left and right extensions which are stitched to the lifting member 76 so that the strap 77 is secured to the lifting member 76.

The proximal end 77b of the strap 77 also has left and right extensions like the distal end 77a, which extensions are secured to the plate member 52 with screws 57, 57 so that the strap 77 is secured to the plate member 52.

Now, an inflation operation of the airbag device 75 in the third embodiment will be described with reference to FIGS. 18, 19 and 20.

In FIG. 18, when a vehicle 10 shown in FIG. 1 collides with an obstacle, an igniter (not shown) is energized, igniting the inflator 40 (see FIG. 4). A high pressure gas generated by the inflator 40 shown in FIG. 4 flows into the airbag 28 via a gas supply pipe 39, and the airbag 28 starts inflating under the gas pressure. The top 28a of the airbag 28 abuts on the inner surface of a cover plate 41 of a cover 26.

Gas continuously flows into the airbag 28, increasing the internal pressure of the airbag 28 to a predetermined pressure P1. The cover plate 41 is boosted by the airbag 28 under the predetermined pressure P1. The cover plate 41 breaks at a central tear seam 41a, a left tear seam 58a at a left corner 58 and a right tear seam 59a at a right corner 59 shown in FIG. 2.

The plate member 52, however, covers a vent hole 23a, preventing a resin plate 60 of a bag pressure release mechanism 30 from being subjected to the predetermined pressure P1. The resin plate 60 is thus prevented from breaking and opening the bag pressure release mechanism 30.

In FIG. 19, with the breakage at the tear seams 41a, 58a and 59a, the cover plate 41 opens like double doors as shown by arrows ⑦. The sidewall 29 of the airbag 28 then uprises substantially vertically.

When the sidewall 29 of the airbag 28 uprises substantially vertically, the lifting member 76, which is connected to the sidewall 29 of the airbag 28, is raised upward. The strap member 77 is pulled upward into a straightened state, and a vertical tensile force F acts on the strap member 77 as shown by an arrow.

Gas continuously flows into the airbag 28, thereby further inflating the airbag 28. As shown in FIG. 20, the lifting member 76 is more strongly stretched in lateral directions to be straightened. The strap member 77 is more strongly pulled upward. The tensile force F (see FIG. 14) acting on the strap member 77 increases to a predetermined value. As a result, the screws 56, 56 fixing the plate member 52 are broken.

With the breakages of the screws 56, 56, the plate member 52 is lifted from the bottom 23 of a bag housing case 22 as shown by arrows ⑧.

With the lifting of the plate member 52, the resin plate 60 of the bag pressure release mechanism 30 faces the inside of the airbag 28 and the internal pressure of the airbag 28 acts on the resin plate 60. At this point of time, however, inflation of the airbag 28 proceeds to an almost finished state, and the internal pressure of the airbag 28 is lower than the predetermined value P1 shown in FIG. 18. Thus the internal pressure of the airbag 28 acting on the resin plate 60 does not break the resin plate 60 to open the bag pressure release mechanism 30.

Gas continuously flows into the airbag 28, fully inflating the airbag 28. In this state, when the obstacle 65 secondarily collides with the airbag 28 as shown in FIG. 11, the airbag 28 is pressed by the obstacle 65. The internal pressure of the airbag 28 increases to a release pressure P2 as described with FIG. 11. The resin plate 60 then breaks at a notch 60a, opening the vent hole 23a formed in the bottom 23 of the bag housing case 22. With the opening of the vent hole 23a, the gas within the airbag 28 escapes through the vent hole 23a, resulting in a mitigated impact on the obstacle 65.

In the airbag device 75 in the third embodiment, the cover 26 is opened without releasing the bag pressure release mechanism 30, thereby to prevent the discharge of gas with the bag pressure release mechanism 30 closed until the obstacle 65 secondarily collides with the airbag 28 as in the airbag device 20 in the first embodiment.

In this manner, the releasing timing of the bag pressure release mechanism 30 is delayed to reduce the amount of gas discharged through the vent hole 23a in the bag housing case 22. It is therefore possible to reduce the gas containing capacity of the inflator 40 to make the inflator 40 compact, thereby to provide the airbag device 75 of a small size.

The airbag device 75 in the third embodiment has a simple structure of only covering the vent hole 23a with the plate member 52 connected to the airbag 28. The bag pressure release mechanism 30 is released only when needed. An internal pressure sensor, control valve and controller which have conventionally been required can be eliminated.

Figure 21:
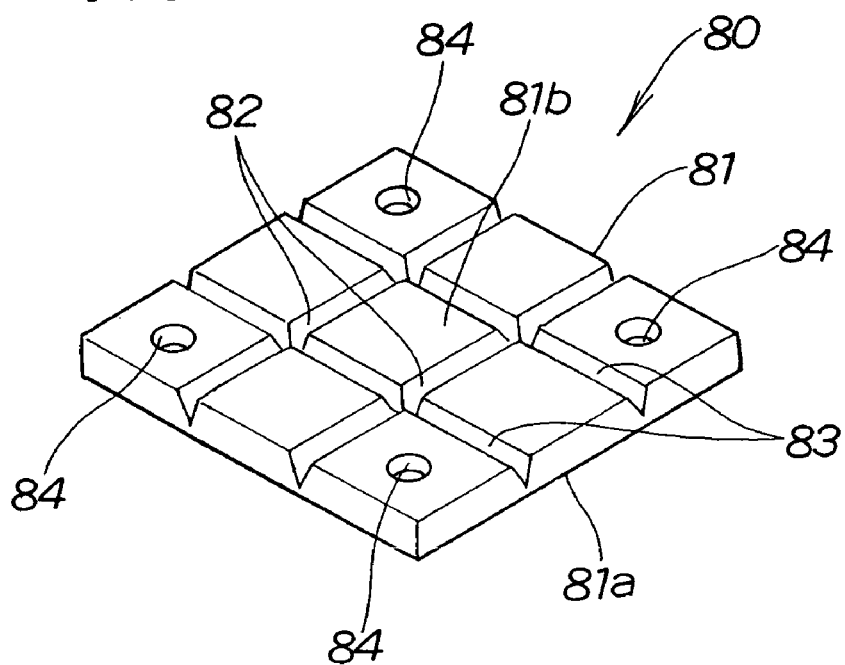
FIG. 21 is a perspective view illustrating another example of a resin plate of a bag pressure release mechanism for use in the airbag devices in the first to third embodiments.

FIG. 21 illustrates another example of the bag pressure release mechanisms described in the first to third embodiments.

A bag pressure release mechanism 80 of another example shown in FIG. 21 is a member replaceable with the bag pressure release mechanism 30 described in the first embodiment. The bag pressure release mechanism 80 has a rectangular resin plate 81 formed in its surface with a pair of parallel notches 82, 82 and a pair of parallel notches 83, 83 orthogonal to the pair of notches 82, 82, and also formed in its four corners with mounting holes 84.

A release pressure P2 of the bag pressure release mechanism 80 is determined by the material of the resin plate 81, the number of notches, the depth of notches, and the length of notches (or the diameter of the vent hole 23a). In other words, the release pressure P2 of the bag pressure release mechanism 80 is adjustable by changing the material of the resin plate 81, the number of notches, the depth of notches, and the length of notches.

In the bag pressure release mechanism 80 in the above example, with a rear surface 81a of the resin plate 81 opposed to the vent hole 23a (shown in FIG. 6), screws are inserted into the mounting holes 84 formed in the four corners of the resin plate 81 for screw-connection to the bottom 23 of the bag housing case 22 (see FIG. 6), whereby the resin plate 81 closes the vent hole 23a.

When the internal pressure of the airbag 28 (see FIG. 11) increases to a predetermined value, the predetermined pressure acts on the resin plate 81 of the bag pressure release mechanism 80, causing the resin plate 81 to brake at the notches 82, 82 and 83, 83. The breakage of the resin plate 81 causes a central portion 81b of the resin plate 81 to be cut off from the resin plate 81, opening the vent hole 23a. Gas is discharged through the open vent hole 23a.

The bag pressure release mechanism 80 in the above example provides the same effects as the bag pressure release mechanism 30 used in the first embodiment.

Moreover, the bag pressure release mechanism 80, having the increased number of notches 82, 82 and 83, 83, further facilitates the adjustment of the release pressure P2.

Although the bag pressure release mechanism 80 has been described with an example of screwing the resin plate 81 to the bottom 23 of the bag housing case 22, it is also possible to mount the resin plate 81 to the bottom 23 of the bag housing case 22 with presser brackets 61, 61 (see FIG. 6) as in the first embodiment.

Figure 22:
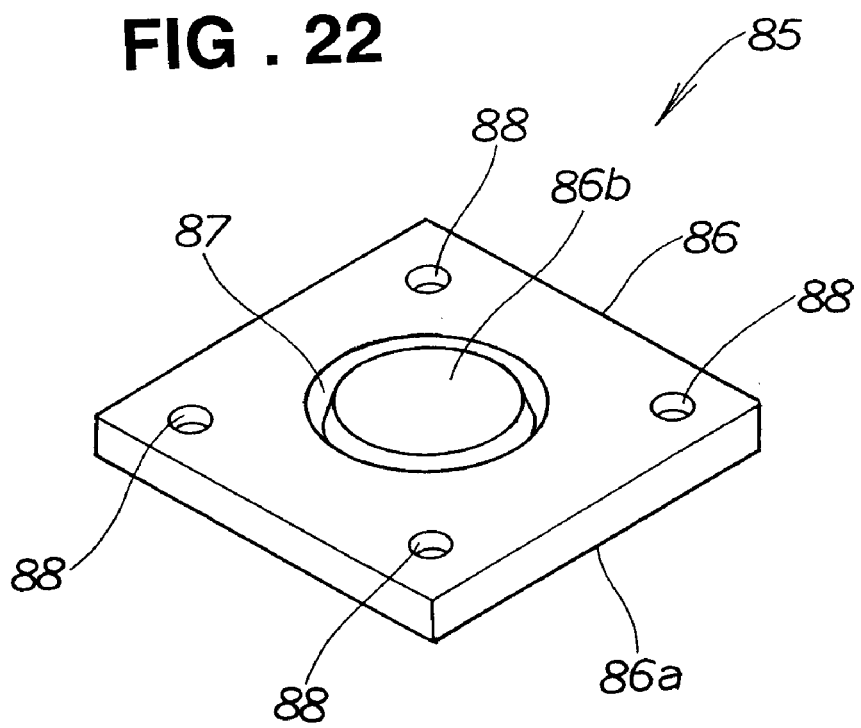
FIG. 22 is a perspective view illustrating still another example of the resin plate shown in FIG. 21.

FIG. 22 illustrates a bag pressure release mechanism 85 according to still another example.

The bag pressure release mechanism 85 is replaceable with the bag pressure release mechanism 30 in the first embodiment. The bag pressure release mechanism 85 has a rectangular resin plate 86 formed in its surface with a circular notch 87 and formed in its four corners with mounting holes 88.

A release pressure P2 of the bag pressure release mechanism 85 is determined by the material of the resin plate 86 and the depth of the notch like the bag pressure release mechanism 80 in the example shown in FIG. 21. The release pressure P2 of the bag pressure release mechanism 85 is adjusted by changing the material of the resin plate 86 and the depth of the notch.

In the bag pressure release mechanism 85 shown in FIG. 22, with a rear surface 86a of the resin plate 86 opposed to the vent hole 23a (shown in FIG. 6), screws are inserted into the mounting holes 88 formed in the four corners of the resin plate 86 for screw-connection to the bottom 23 of the bag housing case 22 (see FIG. 6), whereby the resin plate 86 closes the vent hole 23a.

When the internal pressure of the airbag 28 (see FIG. 11) increases to a predetermined value, the predetermined pressure acts on the resin plate 86 of the bag pressure release mechanism 85, causing the resin plate 86 to brake at the notch 87. The breakage causes a central portion 86b of the resin plate 86 to be cut off from the resin plate 86, opening the vent hole 23a. Gas is discharged through the open vent hole 23a.

The bag pressure release mechanism 85 in the above example provides the same effects as the bag pressure release mechanism 30 in the first embodiment.

Although the bag pressure release mechanism 85 in the example shown in FIG. 22 has been described with an example of screwing the resin plate 86 to the bottom 23 of the bag housing case 22, it is also possible to mount the resin plate 86 to the bottom 23 of the bag housing case 22 with presser brackets 61, 61 (see FIG. 6) as in the first embodiment.

Figure 23:
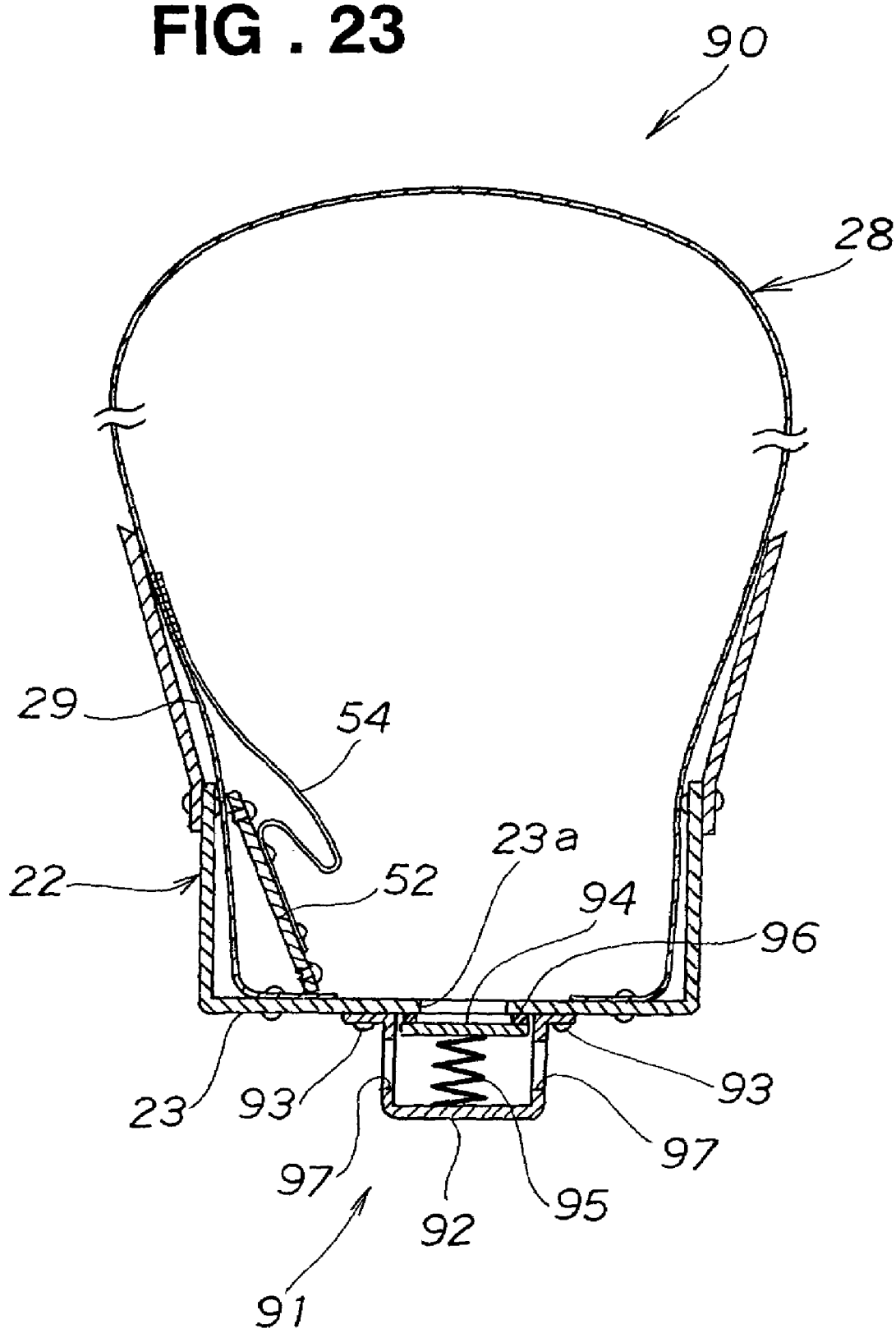
FIGS. 23 and 24 are cross-sectional views illustrating the structure and operation of an airbag device according to a fourth embodiment of the present invention.
Figure 24:
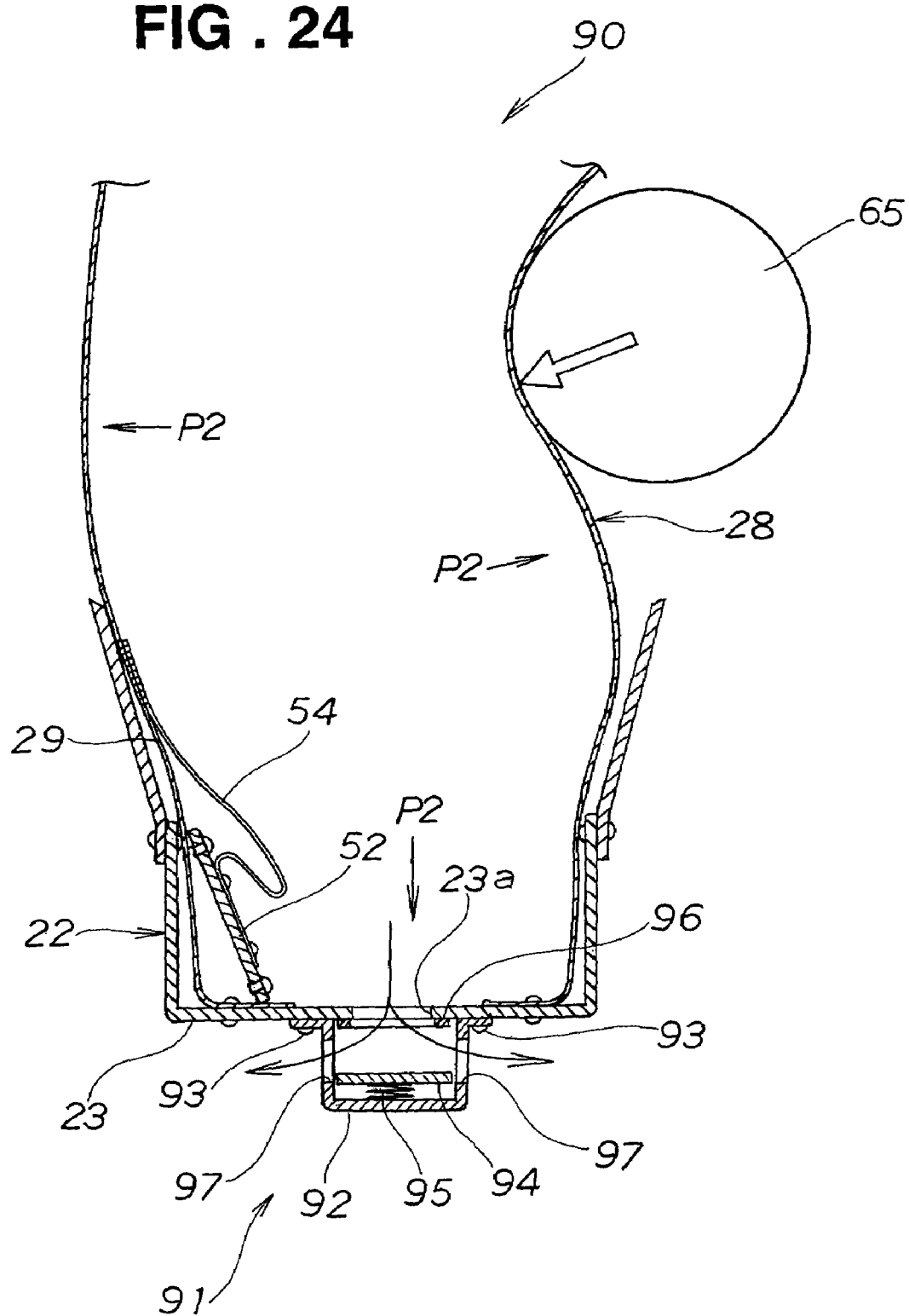

FIGS. 23 and 24 illustrate an airbag device 90 according to a fourth embodiment.

The airbag device 90 in the fourth embodiment has a bag pressure release mechanism 91 at the bottom 23 of a bag housing case 22.

The bag pressure release mechanism 91 has a cap 92 secured to the bottom 23 of the bag housing case 22 with screws 93, 93, and a valve plate 94 disposed in the cap 92. The valve plate 94 is biased to the bottom 23 by a spring 95, thereby closing a vent hole 23a.

A sealing member 96 is disposed between the bottom 23 and the valve plate 94, sealing the gap between the bottom 23 and the valve plate 94. When an airbag 28 inflates, the sealing prevents gas from being discharged through the vent hole 23a as in the first embodiment.

Now, an operation of the airbag device 90 in the fourth embodiment will be described with reference to FIG. 24.

As shown in FIG. 24, when an obstacle 65 secondarily collides with the airbag 28, the airbag 28 is pressed as shown by an arrow. The internal pressure of the airbag 28 increases to a release pressure P2 which acts on the valve plate 94 of the bag pressure release mechanism 91. The valve plate 94 is pushed downward against the spring force of the spring 95, opening the vent hole 23a formed in the bottom 23 of the bag housing case 22.

With the opening of the vent hole 23, gas within the airbag 28 escapes through the vent hole 23a into the cap 92. The gas within the cap 92 escapes outside through outlets 97, 97 as shown by arrows.

The release of gas within the airbag 28 efficiently mitigates an impact on the obstacle 65.

The airbag device 90 in the fourth embodiment provides the same functions and effects as the airbag device 20 in the first embodiment does. The release pressure P2 can be easily adjusted by changing the spring constant of the spring 95.

Although the airbag device 90 in the fourth embodiment has been described with an example of closing the vent hole 23a using the spring 95, it is also possible to use a member of a honeycomb structure in place of the spring 95. Specifically, the valve plate 94 is usually pressed against the bottom 23 by the honeycomb member to close the vent hole 23a with the vent plate 94, and the vent hole 23a is opened by buckling-deforming the honeycomb member under the release pressure P2.

Figure 25:
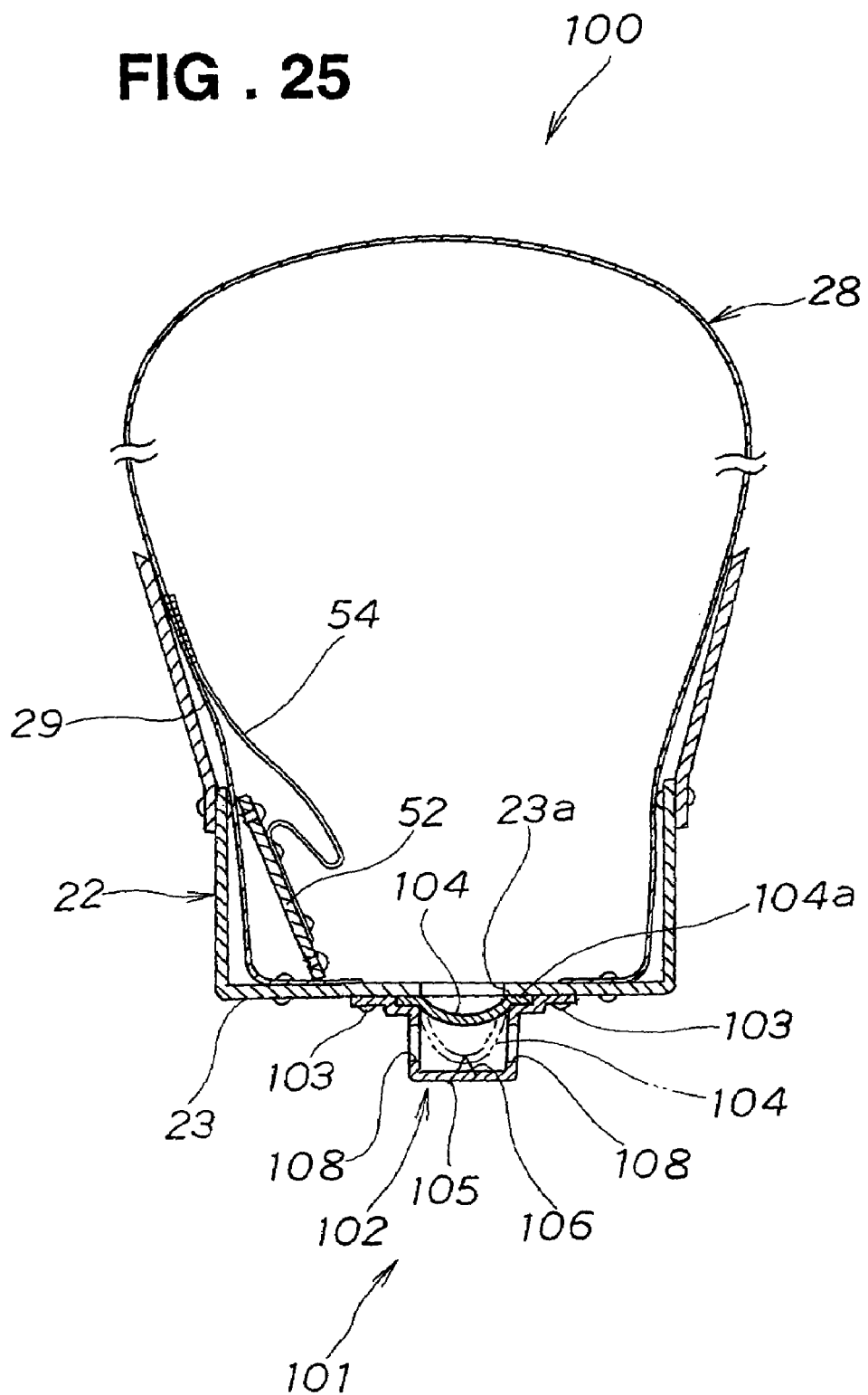
FIGS. 25 and 26 are cross-sectional views illustrating the structure and operation of an airbag device according to a fifth embodiment of the present invention.
Figure 26:
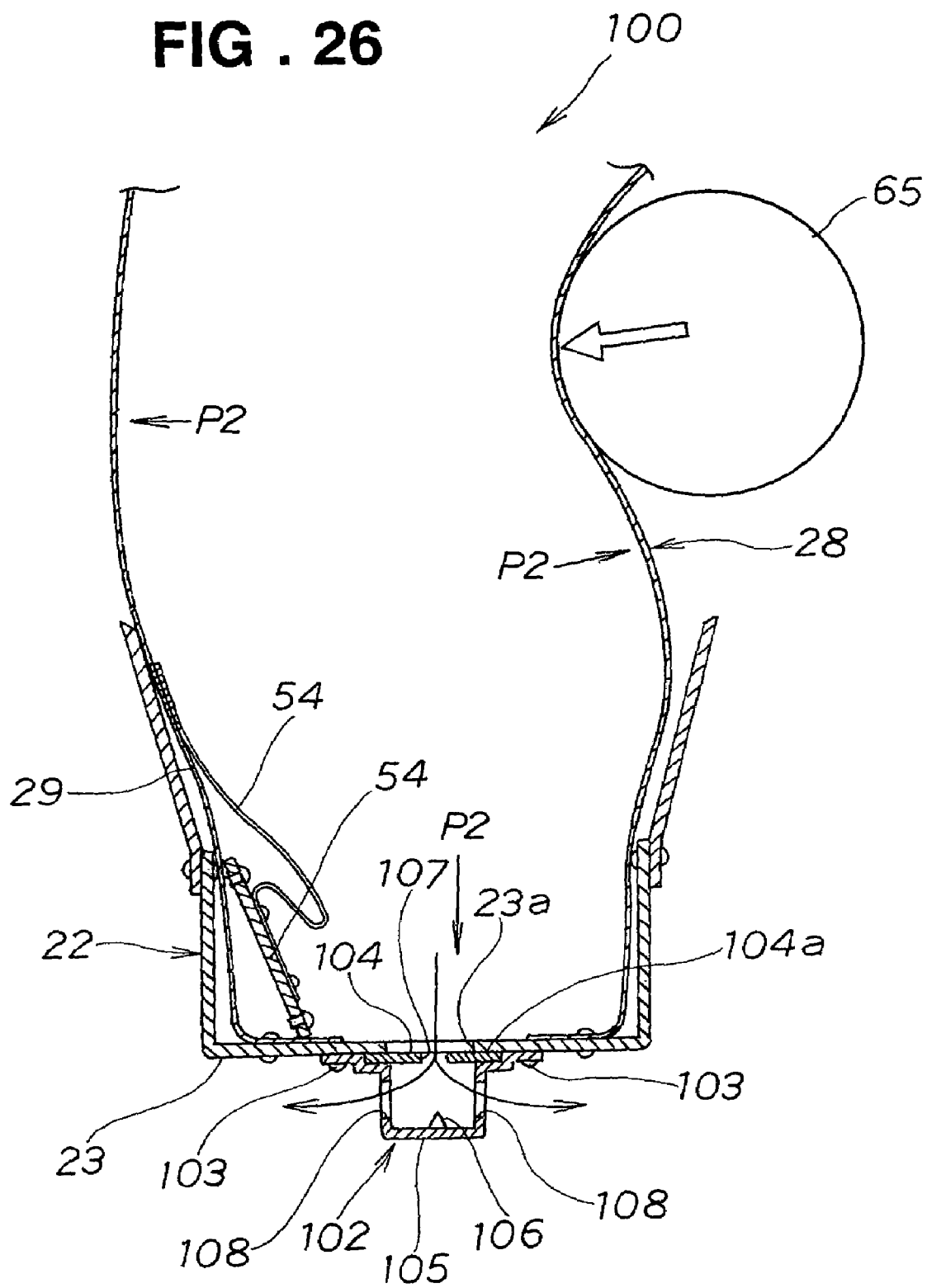

FIGS. 25 and 26 illustrate an airbag device 100 in a fifth embodiment.

A bag pressure release mechanism 101 in the fifth embodiment has a cap 102 secured to the bottom 23 of a bag housing case 22 with screws 103, 103, a rubber plug 104 with a peripheral portion 104a interposed between the bottom 23 of the bag housing case 22 and the cap 102, thereby closing a vent hole 23a with the rubber plug 104. The rubber plug 104 is a resiliently deformable rubber member of a shape with a central portion curved downward.

When the airbag 28 inflates, gas is prevented from exiting through the vent hole 23a as in the airbag device 20 in the first embodiment.

With the bag pressure release mechanism 101, when an obstacle 65 secondarily collides with the airbag 28 as shown in FIG. 26, the airbag 28 is pressed by the obstacle 65 and the internal pressure of the airbag 28 increases to a release pressure P2. The release pressure P2 acts on the rubber plug 104 of the bag pressure release mechanism 101. The central portion of the rubber plug 104 is resiliently deformed as shown by imaginary lines in FIG. 25, contacting a piercing needle 106 provided on the bottom 105 of the cap 102. The rubber plug 104 contacting the piercing needle 106 is broken.

A pierced portion 107 is formed in the center of the rubber plug 104 as shown in FIG. 26 by breaking the center of the rubber plug 104, opening the vent hole 23a of the bag housing case 22. Gas within the airbag 28 escapes through the vent hole 23a into the cap 102. The gas within the cap 102 escapes outside through outlets 108, 108 as shown by arrows.

The release of gas within the airbag 28 efficiently mitigates an impact on the obstacle 65.

The airbag device 100 provides the same effects as the airbag device 20 in the first embodiment. The pierced portion 107 can be formed by breaking the center of the rubber plug 104, which eliminates the need for continuously pushing down the valve plate 94 against the spring force of the spring 95 as in the fourth embodiment shown in FIGS. 23 and 24, resulting in a more efficient discharge of gas within the airbag 28.

Although the fifth embodiment has been described with an example of providing the piercing needle 106 on the bottom 105 of the cap 102 and making the center of the rubber plug 104 contact the piercing needle 106 for opening the rubber plug 104, it is also possible to press the center of the rubber plug 104 against the bottom 105 of the cap 102 without providing the piercing needle 106 on the bottom 105 of the cap 102, to break the rubber plug 104.

Figure 27:
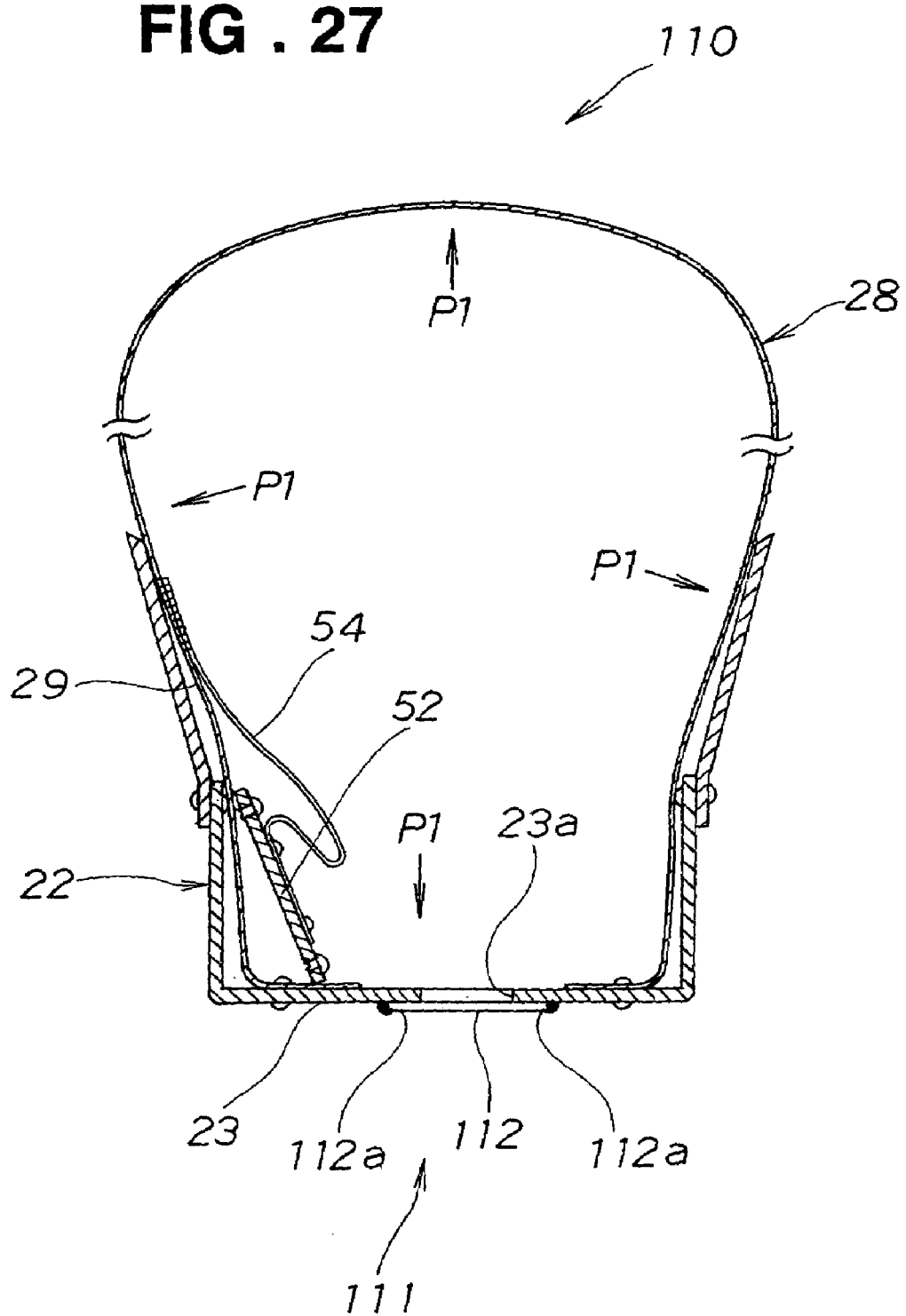
FIGS. 27 and 28 are cross-sectional views illustrating the structure and operation of an airbag device according to a sixth embodiment of the present invention.
Figure 28:
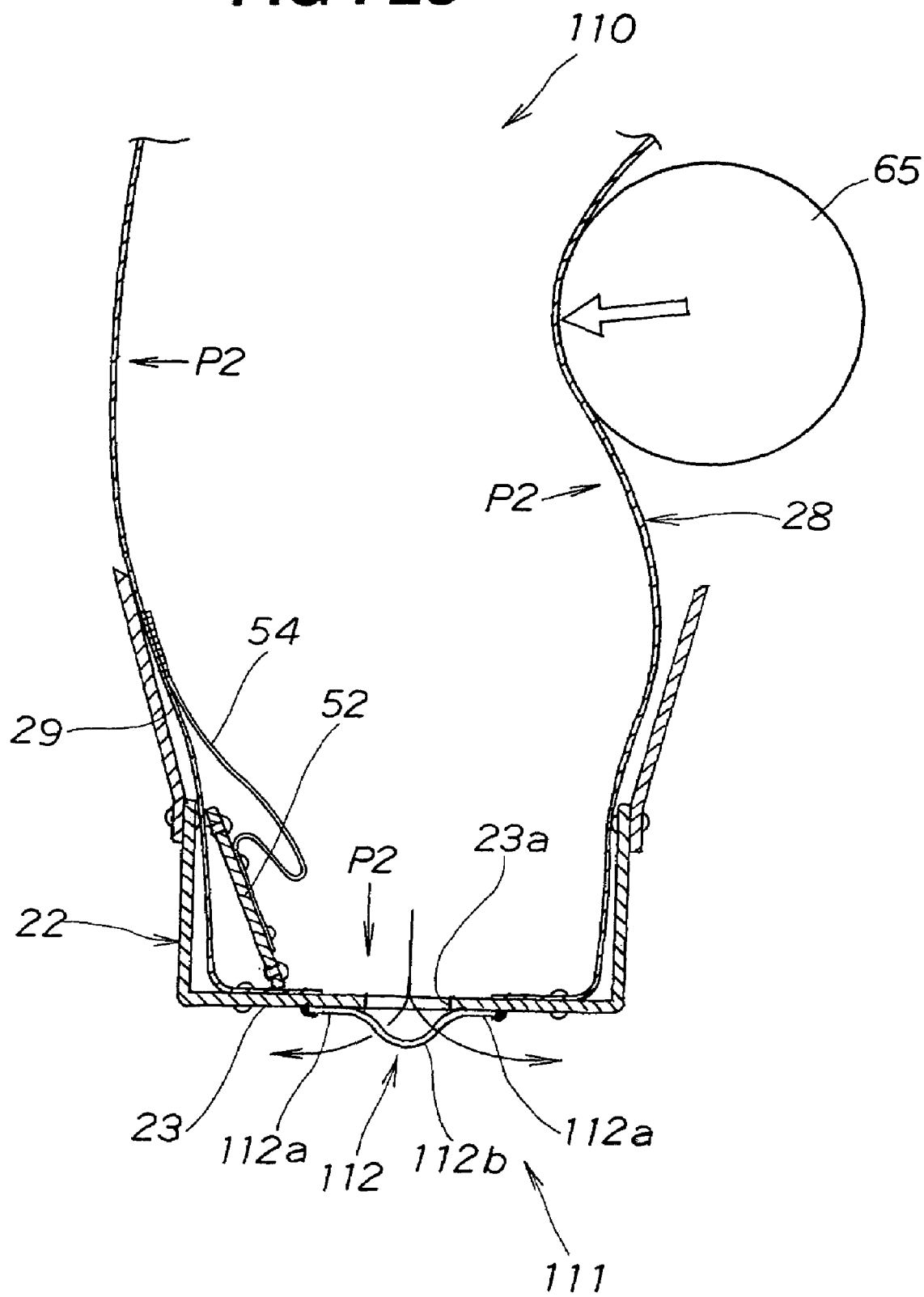

FIGS. 27 and 28 illustrate an airbag device 110 according to a sixth embodiment.

A bag pressure release mechanism 111 in the airbag device 110 in the sixth embodiment has a thin plate 112 opposed to a vent hole 23a formed in the bottom 23 of a bag housing case 22 so that the thin plate 112 closes the vent hole 23a.

The thin plate 112 is formed in a substantially rectangular shape and has opposite ends 112a, 112a as two edges of its four edges, welded to the bottom 23 to close the vent hole 23a. The thin plate 112 is pressure-adapted not to be deformed when the internal pressure of an airbag 28 reaches a predetermined pressure P1 but to be plastically deformed under a release pressure P2 shown in FIG. 28 as described in the first embodiment in FIG. 7. When the airbag 28 inflates, gas is thus prevented from exiting through the vent hole 23a as in the first embodiment.

As shown in FIG. 28, when an obstacle 65 secondarily collides with the airbag 28, the airbag 28 is pressed by the obstacle 65 as shown by an arrow. The internal pressure of the airbag 28 increases to the release pressure P2 which acts on the thin plate 112 of the bag pressure release mechanism 111. Under the release pressure P2, a central portion 112b of the thin plate 112 is plastically deformed into a downward curve. The plastic deformation causes the central portion 112b of the thin plate 112 to be detached from the bottom 23 of the bag housing case 22, opening the vent hole 23a formed in the bottom 23.

The opening of the vent hole 23a causes gas within the airbag 28 to escape outside through the vent hole 23a as shown by arrows.

The release of gas within the airbag 28 efficiently mitigates an impact on the obstacle 65.

In the airbag device 110 in the sixth embodiment, the thin plate 112 is plastically deformed to open the vent hole 23a. Once opened, the vent hole 23a is not closed. Gas within the airbag 28 is thus efficiently discharged.

Figure 29:
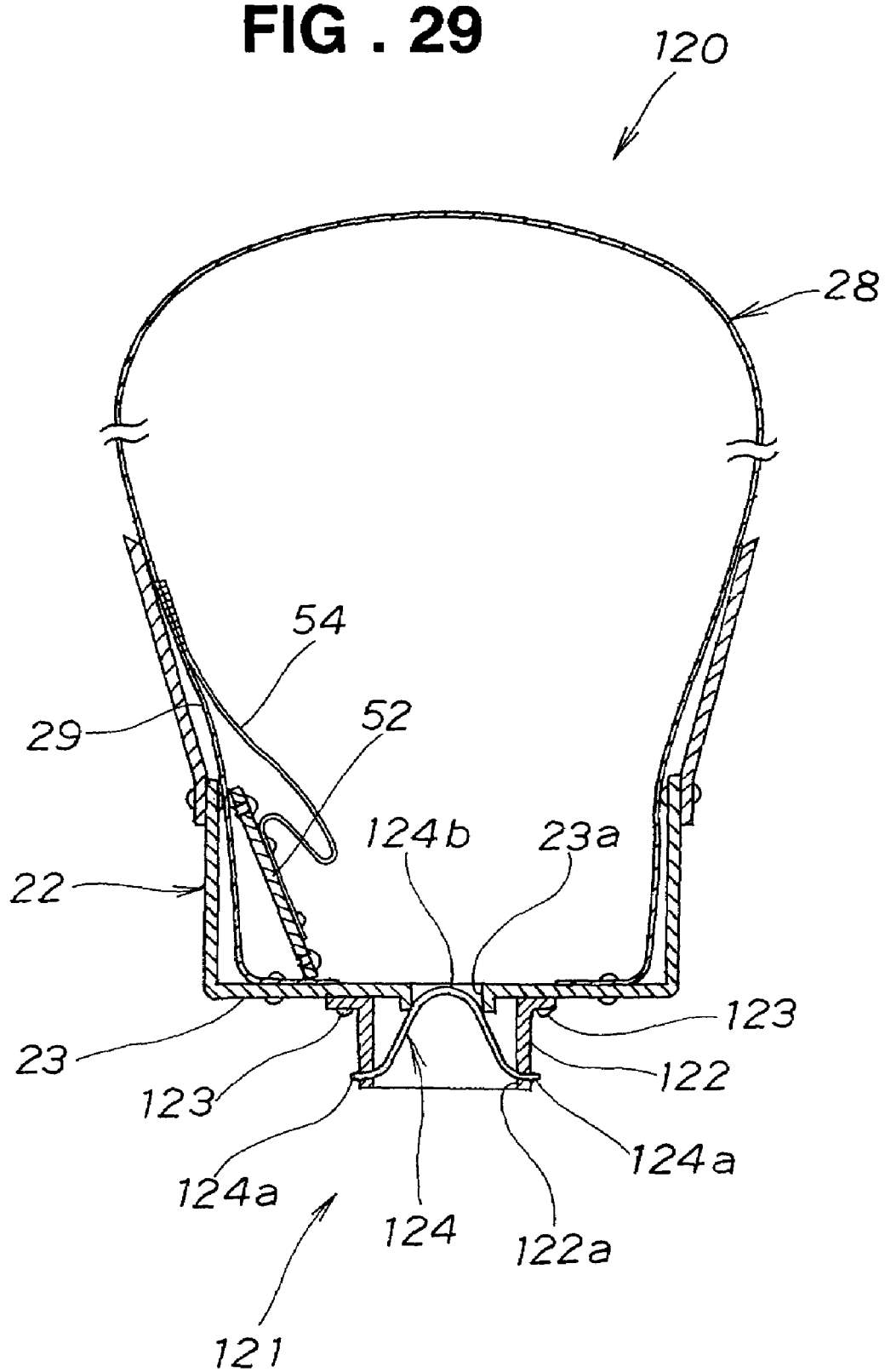
FIGS. 29 and 30 are cross-sectional views illustrating the structure and operation of an airbag device according to a seventh embodiment of the present invention.
Figure 30:
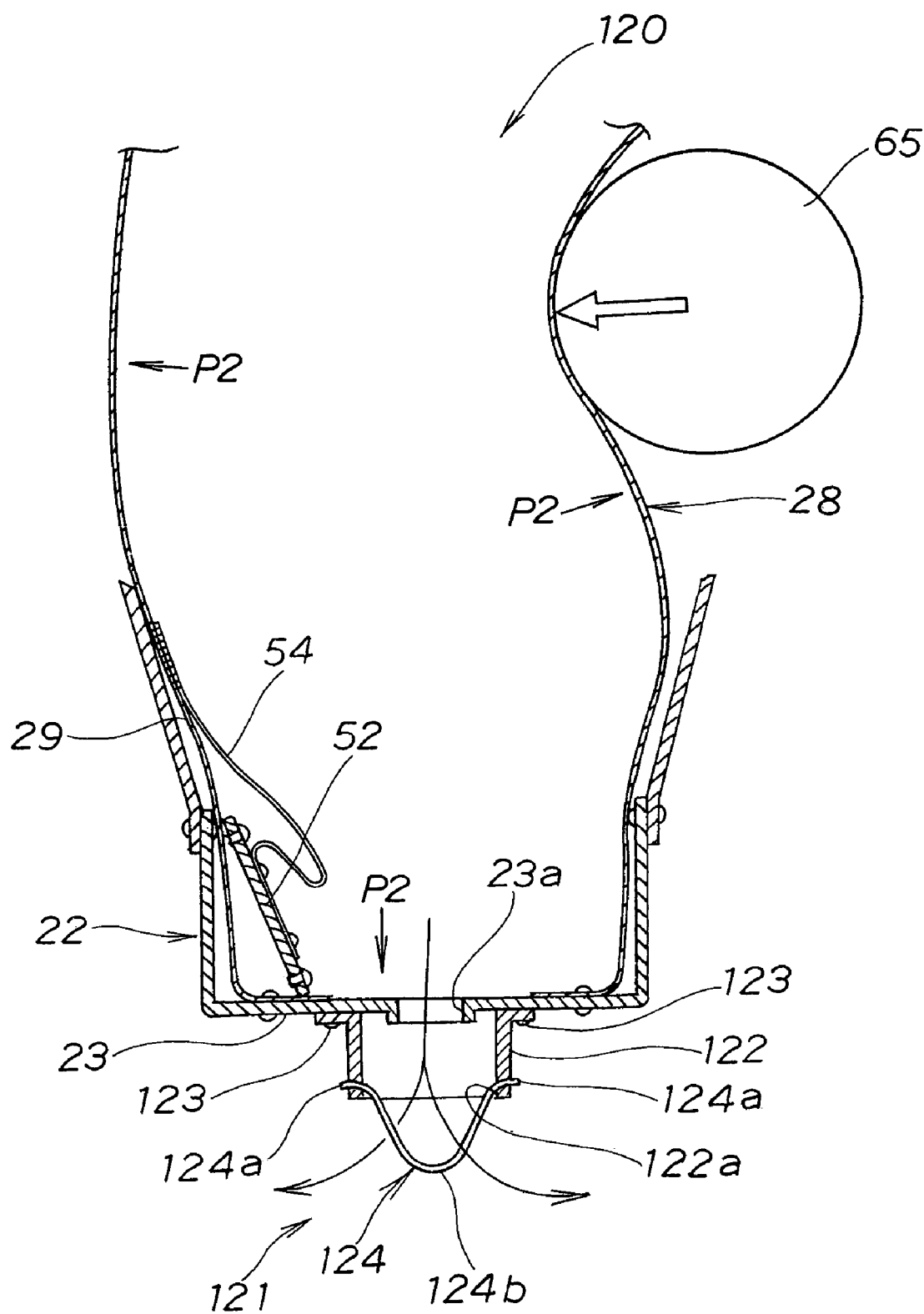

FIGS. 29 and 30 illustrate an airbag device 120 according to a seventh embodiment of the present invention.

A bag pressure release mechanism 121 in the airbag device 120 of the seventh embodiment has a rectangular hollow body 122 secured to the bottom 123 of a bag housing case 122 with screws 123, 123 and a plate spring 124 with opposite ends 124a, 124a secured in the vicinities of a distal end opening 122a of the rectangular hollow body 122 and with a central portion 124b resiliently deformed in an upward curve, thereby closing a vent hole 23a with the central portion 124b. The vent hole 23a is formed in a rectangular shape so as to be efficiently closed by the plate spring 124. When the airbag 28 inflates, gas is prevented from being discharged through the vent hole 23a as in the first embodiment.

As shown in FIG. 30, when an obstacle 65 secondarily collides with an airbag 28, the airbag 28 is pressed by the obstacle 65 as shown by an arrow. The internal pressure of the airbag 28 increases to a release pressure P2. The release pressure P2 acts on the central portion 124b of the plate spring 124 of the bag pressure release mechanism 121 (the plate spring 124 in the state in FIG. 29). Under the release pressure P2, the plate spring 124 is pushed downward against the spring force, being resiliently deformed in a downward curve. The central portion 124b of the plate spring 124 is detached from the bottom 23 of the bag housing case 22, opening the vent hole 23a formed in the bottom 23.

The opening of the vent hole 23a causes gas within the airbag 28 to escape through the vent hole 23a into the rectangular hollow body 122. The gas within the rectangular hollow body 122 escapes outside through the distal end opening 122a as shown by arrows.

The release of gas within the airbag 28 efficiently mitigates an impact on the obstacle 65.

The airbag device 120 in the seventh embodiment has the same effects as the airbag device 20 in the first embodiment. In the airbag device 120 in the seventh embodiment, the plate spring 124 is resiliently deformed from an upward curved shape into a downward curved shape to open the vent hole 23a. Once opened, the vent hole 23a is not closed. Gas within the airbag 28 can thus be more efficiently discharged.

Figure 31:
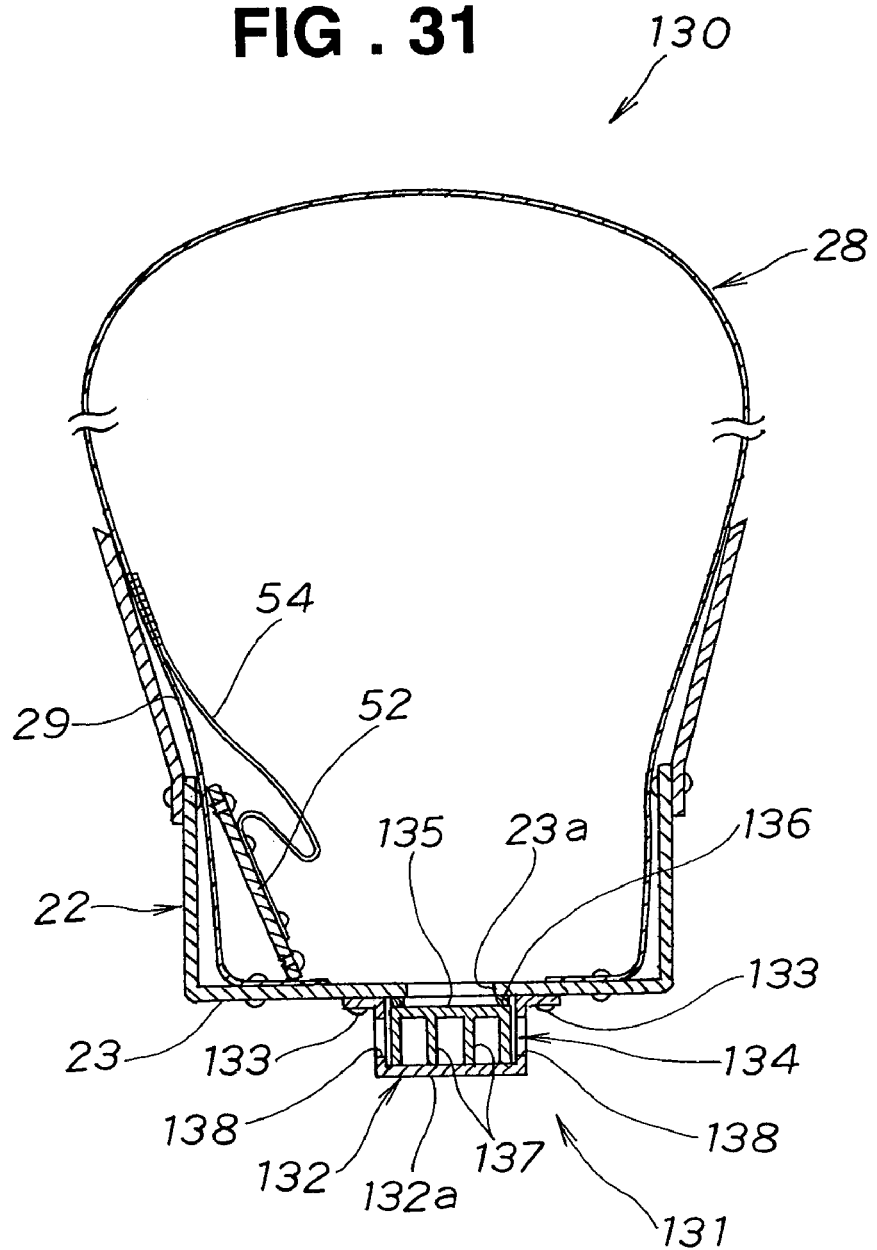
FIG. 31 is a cross-sectional view illustrating an airbag device according to an eighth embodiment of the present invention.
Figure 32:
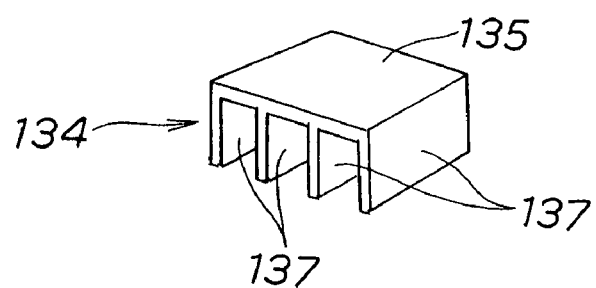
FIG. 32 is a perspective view of a plug member as a component of a bag pressure release mechanism shown in FIG. 31.
Figure 33:
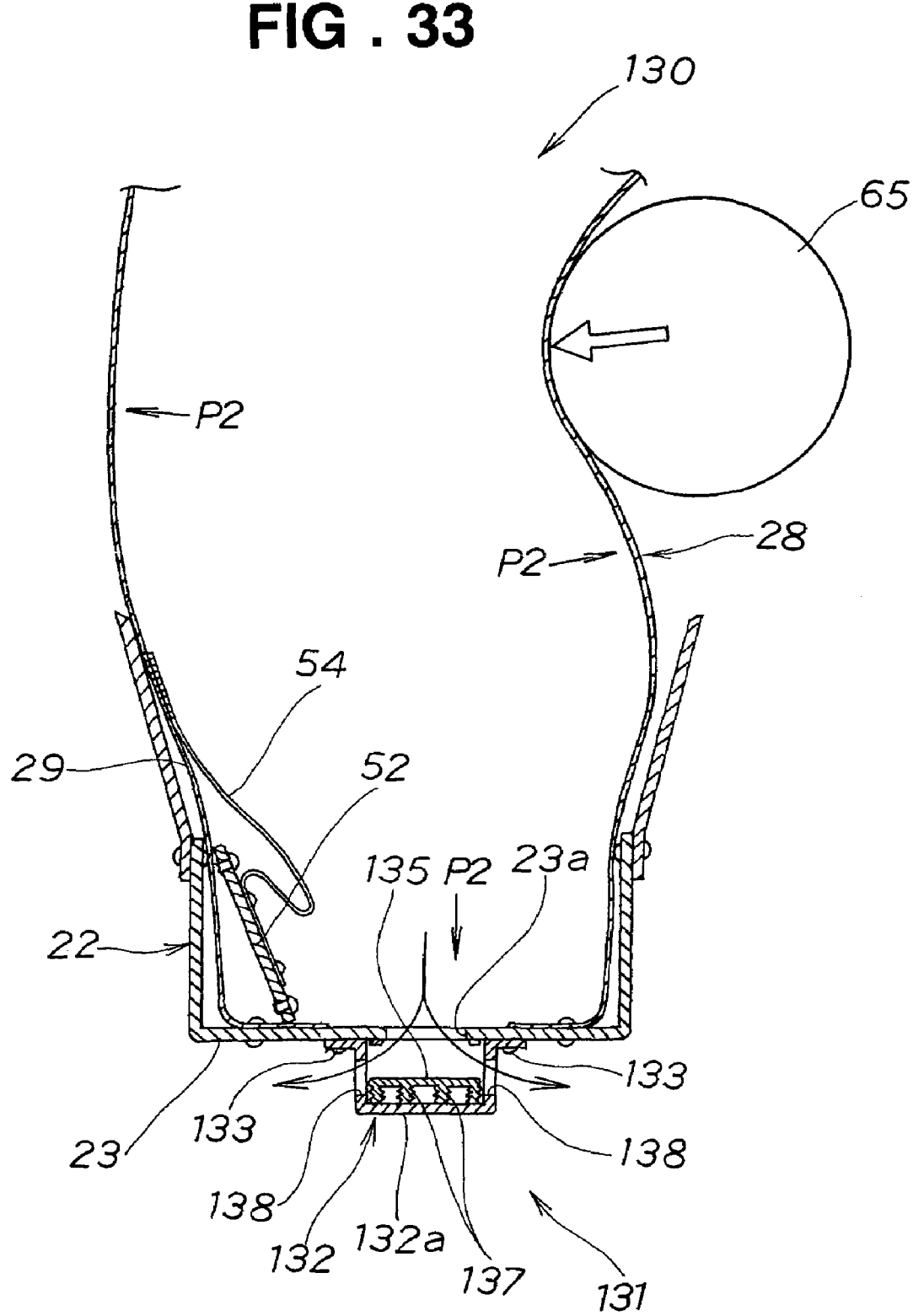
FIG. 33 is a cross-sectional view illustrating the operation of the airbag device in the eighth embodiment.

FIGS. 31, 32 and 33 illustrate an airbag device 130 according to an eighth embodiment of the present invention.

A bag pressure release mechanism 131 in the airbag device 130 of the eighth embodiment has a cap 132 secured to the bottom 23 of a bag housing case 22 with screws 133, 133, and a plug member 134 disposed in the cap 132, being placed on the bottom 132a of the cap 132 so that an upper plate 135 of the plug member 134 is pressed against the bottom 23 via a sealing member 136 to close the vent hole 23a with the upper plate 135. When an airbag 28 inflates, gas is prevented from exiting through the vent hole 23a as in the airbag device 20 in the first embodiment.

As shown in FIG. 32, the plug member 134 has four ribs 137 extending downward from the upper plate 135 at regular intervals. The plug member 134 is made from resin (such as propylene (PP)). The height of the four ribs 137 is determined so that the upper plate 135 abuts on the bottom 23 of the bag housing case 22 when the plug member 134 is placed on the bottom 132a of the cap 132 shown in FIG. 31.

As shown in FIG. 33, when an obstacle 65 secondarily collides with the airbag 28, the airbag 28 is pressed by the obstacle 65 as shown by an arrow, and the internal pressure of the airbag 28 increases to a release pressure P2. The release pressure P2 acts on the upper plate 135 of the bag pressure release mechanism 131. The release pressure P2 buckling-deforms the four ribs 137 extending downward from the upper plate 135, pressing the upper plate 135 downward. The vent hole 23a formed in the bottom 23 of the bag housing case 22 is opened.

The opening of the vent hole 23a causes gas within the airbag 28 to escape through the vent hole 23a into the cap 132. The gas within the cap 132 escapes outside through outlets 138, 138 as shown by arrows.

The release of gas within the airbag 28 efficiently mitigates an impact on the obstacle 65.

The airbag device 130 in the eighth embodiment has the same effects as the airbag device 20 in the first embodiment. With the airbag device 130, the release pressure P2 can be easily adjusted by changing the plate thickness and the number of the four ribs 137.

Figure 34:
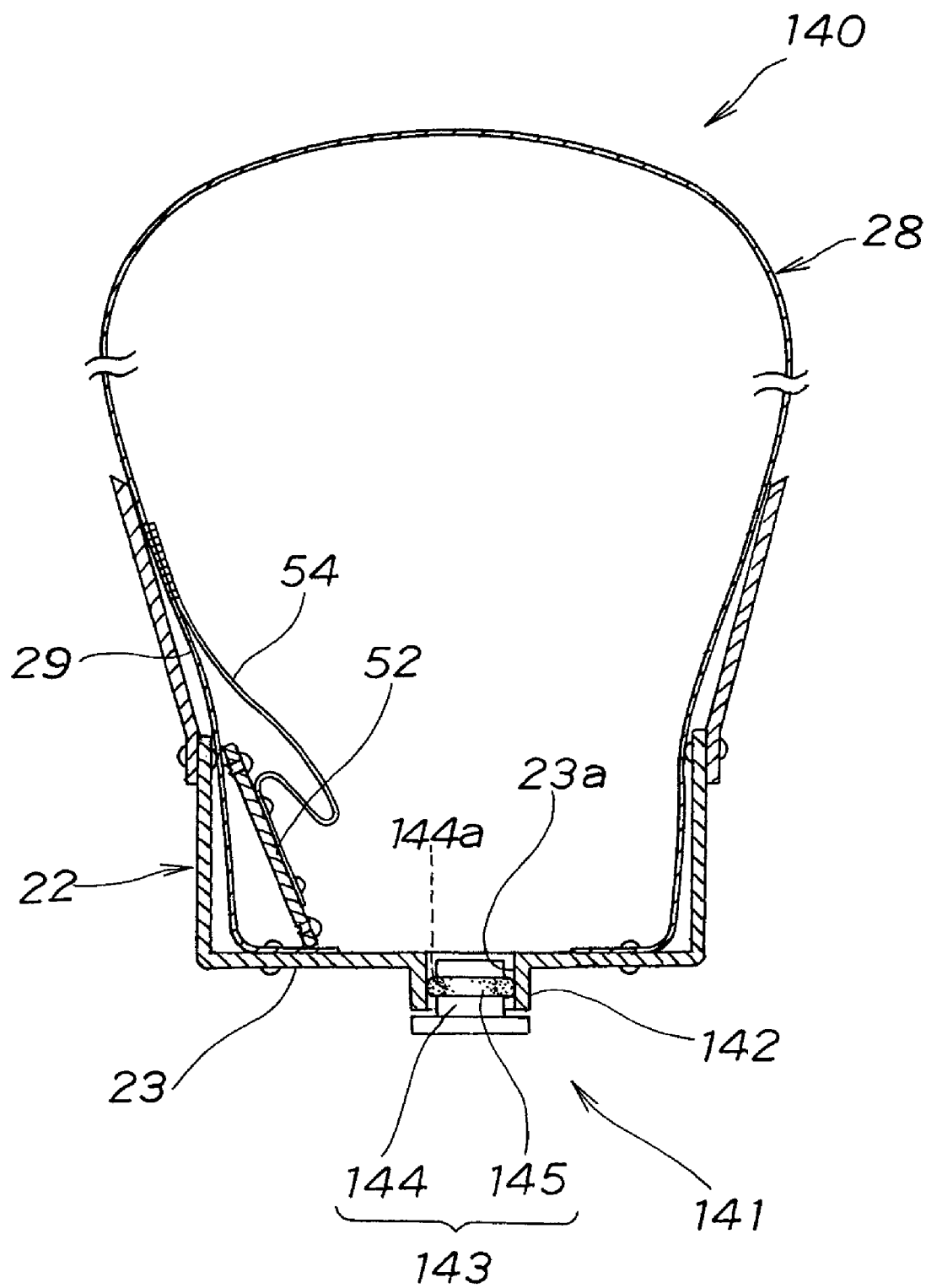
FIGS. 34 and 35 are cross-sectional views illustrating the structure and operation of an airbag device according to a ninth embodiment of the present invention.
Figure 35:
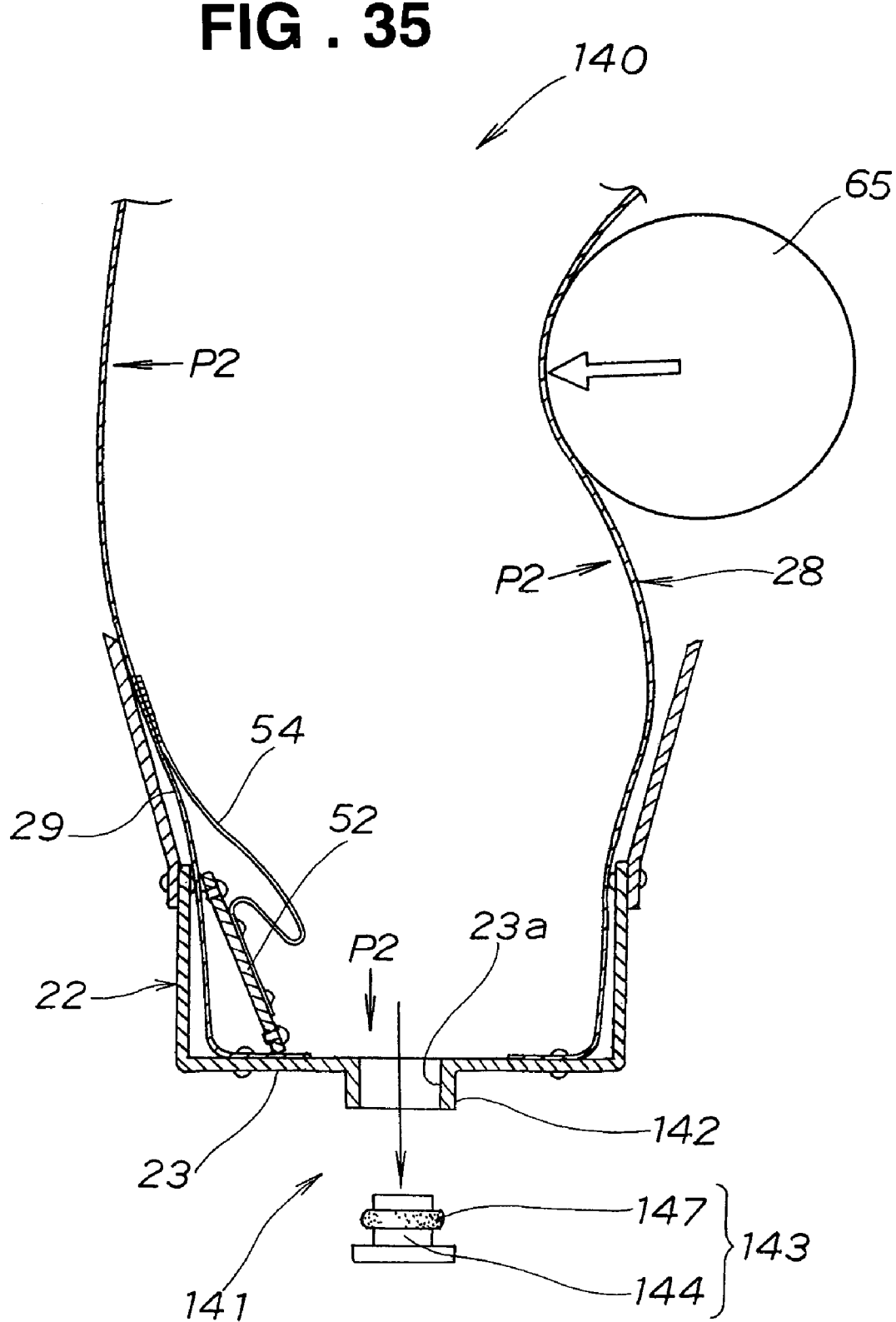

FIGS. 34 and 35 illustrate an airbag device 140 according to a ninth embodiment of the present invention.

A bag pressure release mechanism 141 in the airbag device 140 of the ninth embodiment has a tubular outlet 142 formed at the bottom 23 of a bag housing case 22, being protruded downward, and a plug member 143 inserted into a vent hole 23a of the outlet 142 to close the vent hole 23a.

The plug member 143 has a plug body 144 formed with a ring groove 144a around the outer periphery, and an O-ring 145 fitted onto the ring groove 144a. When the plug member 143 is inserted into the vent hole 23a, the O-ring 145 closes the gap between the plug body 144 and the vent hole 23a.

When an airbag 28 inflates, gas is prevented from exiting through the vent hole 23a as in the first embodiment.

As shown in FIG. 35, when an obstacle 65 secondarily collides with the airbag 28, the airbag 28 is pressed by the obstacle 65 as shown by an arrow. The internal pressure of the airbag 28 increases to a release pressure P2 which acts on the plug member 143 of the bag pressure release mechanism 141. Under the release pressure P2, the plug member 143 is pressed downward and removed from the vent hole 23a formed in the bottom 23 of the bag housing case 22. The vent hole 23a is thus opened, allowing gas within the airbag 28 to escape outside through the vent hole 23a as shown by an arrow.

The release of gas within the airbag 28 efficiently mitigates an impact on the obstacle 65.

The airbag device 140 in the ninth embodiment has the same effects as the airbag device 20 in the first embodiment. In the airbag device 140, the vent hole 23a can be closed only by inserting the plug member 143 into the vent hole 23a in the bag housing case 22, resulting in simplification of the bag pressure release mechanism 141 and reduced restrictions on mounting space for mounting the bag pressure release mechanism 141. The release pressure P2 is properly adjusted by changing the frictional force between the O-ring 145 and the vent hole 23a.

The first to ninth embodiments have been described with the examples of airbag devices each having the airbag 28 to be inflated over the windshield 13. The present invention is not limited to the airbag devices and may also be used for an airbag device with the airbag 28 to be inflated over an A-pillar.

Obviously, various minor changes and modifications of the present invention are possible in the light of the above teaching. It is therefore to be understood that without departing from the scope of the appended claims, the invention may be practiced otherwise than as specifically described.

What is claimed is:

1. An airing device for a vehicle, comprising:
   a bag housing case adapted to be disposed below a rear end of a bonnet in proximity to a bottom portion of a windshield of the vehicle, the bag housing case having an opening and a cover mounted to close the opening;
   an airbag housed in a deflated, folded state within the bag housing case for deployment forward of the windshield to mitigate an impact on an obstacle when the obstacle collides with the airbag being deployed;
   a plate member disposed within the bag housing case and connected to the airbag;
   a strap connecting the plate member to a sidewall of the airbag inside the bag housing case; and
   a bag pressure release mechanism disposed in a confronting relation to an inside of the airbag, said mechanism being designed to release an internal pressure of the airbag when the internal pressure of the airbag reaches a predetermined pressure after the airbag is inflated, thereby preventing an increase in the internal pressure of the airbag,
   wherein the cover is designed to open the opening of the bag housing case when subjected to a force produced when the internal pressure of the airbag reaches a given pressure less than the predetermined internal pressure, as the airbag is inflated,
   wherein the plate member is designed such that the plate member covers the bag pressure release mechanism when the airbag is in the deflated, folded state within the airbag and continues to cover the bag pressure release mechanism to thereby prevent the bag pressure release mechanism from being subjected to the given pressure created inside the airbag until the plate member is released from coverage of the bag pressure release mechanism when pulled by the strap as the sidewall of the airbag uprises due to continuing inflation and deployment of the airbag occurring after the cover opens the opening of the bag housing case, and
   wherein the bag pressure release mechanism is designed to release internal pressure of the airbag when the internal pressure of the airbag is caused to increase from the given pressure to the predetermined pressure due to collision of the obstacle with the airbag being deployed.

2. An airbag device as set forth in claim 1, wherein the bag housing case has at least one vent hole formed in a bottom thereof.

3. An airbag device as set forth in claim 2, wherein the plate member is detachably mounted to an inside surface of the bottom of the bag housing case for covering the at least one vent hole, and the bag pressure release mechanism is mounted to an outside surface of the bottom of the bag housing case for covering the vent hole.

4. An airbag device as set forth in claim 2, wherein the bag pressure release mechanism is designed to release gas within the airbag outside through the vent bole when at least the predetermined pressure is formed within the airbag.

5. An airbag device as set forth in claim 4, the bag pressure release mechanism comprising:
   a resin plate;
   a v-shaped notch provided on a surface of the resin plate opposite the plate member;
   a pair of brackets securing the resin plate to the bag housing case and over the vent hole; and
   a sealing member provided adjacent to the vent hole, between the resin plate and the bag housing case,
   wherein upon the internal pressure of the airbag reaching the predetermined pressure, the resin plate breaks at the v-shaped notch, thereby opening the vent bole and releasing the gas within the airbag.

6. An airbag device as set forth in claim 4, the bag pressure release mechanism comprising:
   a rectangular resin plate;
   a first pair of parallel notches provided on a surface of the resin plate opposite the plate member;
   a second pair of parallel notches provided on the surface of the resin plate orthogonal to the first pair of parallel notches; and
   a mounting hole provided in each corner of the rectangular resin plate,
   wherein upon the internal pressure of the airbag reaching the predetermined pressure, the rectangular resin plate breaks at the first and second pair of notches, thereby opening the vent hole and releasing the gas within the airbag.

7. An airbag device as set forth in claim 4, the bag pressure release mechanism comprising:
   a rectangular resin plate;
   a circular notch provided on a surface of the resin plate opposite the plate member;
   a mounting hole provided in each corner of the rectangular resin plate,
   wherein upon the internal pressure of the airbag reaching the predetermined pressure, the resin plate breaks at the circular notch, thereby opening the vent hole and releasing the gas within the airbag.

8. An airbag device as set forth in claim 4, the bag pressure release mechanism comprising:
   a cap secured to the outside surface of the bottom of the bag housing case;
   a spring provided within the cap;
   a valve plate disposed within the cap and biased to die bottom of the bag housing case by the spring; and
   a sealing member disposed between the bottom of the bag housing case and the valve plate,
   wherein upon the internal pressure of the airbag reaching the predetermined pressure, the valve plate is pushed downward against the spring, thereby opening the vent hole and releasing the gas within the airbag.

9. An airing device as set forth in claim 4, the bag pressure release mechanism comprising:
   a cap secured to the outside surface of the bottom of the bag housing case;
   a rubber plug with a peripheral portion interposed between the bottom of the bag housing case and the cap; and
   a piercing needle integral with the cap and facing the rubber plug,
   wherein upon the internal pressure of the airbag reaching the predetermined pressure, the center portion of the rubber plug is resiliently deformed, contacting the piercing needle, thereby breaking the rubber plug, opening the vent hole, and releasing the gas within the airbag.

10. An airbag device as set forth in claim 4, the bag pressure release mechanism comprising:

a thin plate secured to the outside surface of the bottom of the bag housing case, opposing to the vent hole, wherein upon the internal pressure of the airbag reaching the predetermined pressure, the thin plate deforms into a downward curve, thereby detaching from the bottom of the bag housing case, opening the vent hole, and releasing the gas within the airbag.

11. An airbag device as set forth in claim 4, the bag pressure release mechanism comprising:

a rectangular hollow body secured to the bottom of the bag housing case and opposing to the vent hole; and a plate spring secured in a distal end opening of the rectangular hollow body with a central portion of the plate spring resiliently deformed in an upward curve, wherein upon the internal pressure of the airbag reaching the predetermined pressure, the internal pressure acts on the central portion of the plate spring, thereby pushing the plate spring downward, resiliently deforming the plate spring in a downward curve, and detaching the central portion from the vent hole, and releasing the gas within the airbag.

12. An airbag device as set forth in claim 4, the bag pressure release mechanism comprising:

a cap secured to the outside surface of the bottom of the bag housing case;

a plug member disposed in a bottom portion of the cap, adapted to press an upper plate of the plug member against the bottom of the bag housing case; and a sealing member provided between the upper plate of the plug member and the bag housing case, wherein upon the internal pressure of the airbag reaching the predetermined pressure, the internal pressure acts on the upper plate of the plug member, thereby pressing and deforming the upper plate of the plug member downward, opening the vent hole, and releasing the gas within the airbag.

13. An airbag device as set forth in claim 4, the bag pressure release mechanism comprising:

a plugging member provided within the vent hole;

a tubular outlet protruding downward from and integral to the bottom of the bag housing case, wherein upon the internal pressure of the airing reaching the predetermined pressure, the internal pressure acts on the plugging member, pressing the plugging member downward and thereby removing the plugging member from the vent hole, and releasing the gas within the airbag.

* * * * *